(12) United States Patent
Mizoguchi et al.

(10) Patent No.: US 11,602,875 B2
(45) Date of Patent: Mar. 14, 2023

(54) INJECTION MOLDING APPARATUS AND INJECTION MOLDING METHOD

(71) Applicant: KAGA WORKS CO., LTD., Iida (JP)

(72) Inventors: Osamu Mizoguchi, Nagoya (JP);
Hitoshi Tsujikawa, Nagoya (JP);
Kyota Imai, Nagoya (JP)

(73) Assignee: KAGA WORKS CO., LTD., Iida (JP)

(*) Notice: Subject to any disclaimer, the term of this patent is extended or adjusted under 35 U.S.C. 154(b) by 815 days.

(21) Appl. No.: 16/466,068

(22) PCT Filed: Dec. 5, 2017

(86) PCT No.: PCT/JP2017/043689
§ 371 (c)(1),
(2) Date: Nov. 27, 2019

(87) PCT Pub. No.: WO2018/105622
PCT Pub. Date: Jun. 14, 2008

(65) Prior Publication Data
US 2020/0298451 A1 Sep. 24, 2020

(30) Foreign Application Priority Data
Dec. 7, 2016 (JP) .............................. JP2016-237293

(51) Int. Cl.
*B29C 33/10* (2006.01)
*B29C 39/26* (2006.01)
(Continued)

(52) U.S. Cl.
CPC .............. *B29C 33/10* (2013.01); *B29C 39/26* (2013.01); *B29C 45/34* (2013.01); *B29L 2031/06* (2013.01)

(58) Field of Classification Search
CPC ...................................................... B29C 45/34
See application file for complete search history.

(56) References Cited

U.S. PATENT DOCUMENTS 5,443,778 A * 8/1995 Schlingman ............ B29C 45/34
264/257
8,522,890 B2 9/2013 Abe et al.
(Continued)

FOREIGN PATENT DOCUMENTS

JP S59192315 U 12/1984
JP S639689 U 1/1988
(Continued)

OTHER PUBLICATIONS

JP 2014028498 (Nakagawa) Jul. 2012 (online machine translation), [Retrieved on Jun. 22, 2022]. Retrieved from: Espacenet (Year: 2012).*

(Continued)

*Primary Examiner* — Alison L Hindenlang
*Assistant Examiner* — Andrés E. Behrens, Jr.
(74) *Attorney, Agent, or Firm* — J-Tek Law PLLC; Jeffrey D. Tekanic; Scott T. Wakeman

(57) ABSTRACT

A mold unit (30) defines an elongate cavity (70) and has an injection inlet port (90) for a viscous material at one end of the cavity and an injection outlet port (92) at the other end of the cavity. The mold unit includes a gas vent formed by a gap (G2) between two parts of the mold unit. The gap extends continuously or intermittently in the length direction of the the mold unit, while penetrating through the mold unit in the thickness direction such that it provides fluid communication between an interior space and an exterior space of the cavity. The gap is shaped such that, although gasses pass through, the viscous material does not pass due to fluidity resistance of the viscous material resulting from its viscosity. As a result, the gas vent acts to block leakage of the viscous material while permitting degassing of the viscous material.

20 Claims, 14 Drawing Sheets

(51) Int. Cl.
    *B29C 45/34*     (2006.01)
    *B22C 9/10*     (2006.01)
    *B22C 9/06*     (2006.01)
    *B29L 31/06*     (2006.01)

(56) References Cited

U.S. PATENT DOCUMENTS

| | | | | |
|---|---|---|---|---|
| 2008/0206393 | A1* | 8/2008 | Kim | B22D 17/145 |
| | | | | 425/546 |
| 2013/0228951 | A1* | 9/2013 | Jang | B29C 45/0046 |
| | | | | 425/546 |
| 2017/0326719 | A1 | 11/2017 | Ueda | |

FOREIGN PATENT DOCUMENTS

| | | | | | |
|---|---|---|---|---|---|
| JP | 2004262028 | * | 2/2003 | ............ | B29C 33/10 |
| JP | 2004262028 | A | 9/2004 | | |
| JP | 2008524038 | A | 7/2008 | | |
| JP | 2009174685 | A | 8/2009 | | |
| JP | 2011156758 | A | 8/2011 | | |
| JP | 2012066533 | A | 4/2012 | | |
| JP | 2014028498 | * | 7/2012 | ............ | B29C 33/10 |
| JP | 2014028498 | A | 2/2014 | | |

OTHER PUBLICATIONS

JP-2004262028 (Nagaoka) Feb. 2003 (online machine translation), [Retrieved on Jun. 22, 2022]. Retrieved from: Espacenet (Year: 2003).*

English translation of the Written Opinion of the International Searching Authority dated Feb. 13, 2018 for parent application No. PCT/JP2017/043689.

English translation of the International Search Report of the International Searching Authority dated Feb. 13, 2018 for parent application No. PCT/JP2017/043689.

* cited by examiner

SECT. A—A  SECT. B—B

SECT. C—C

SECT. D—D

INJECTION MOLDING APPARATUS AND INJECTION MOLDING METHOD

CROSS-REFERENCE

This application is the US national stage of International Patent Application No. PCT/JP2017/043689 filed on Dec. 5, 2017, which claims priority to Japanese Patent Application No. 2016-237293 filed on Dec. 7, 2016.

TECHNICAL FIELD

The invention relates to techniques for producing products by molding, and in particular, to a technique for injection molding products using a viscous material as a raw material.

BACKGROUND ART

A sealing method that seals a structural body by applying a liquid sealant or caulk made of a viscous material (hereinafter, collectively referred to as "sealant") to the structural body already exists. For example, such a sealing method is implemented for the purpose of filling a gap between two members of a structural body (e.g., a joint or seam between interconnected portions of two overlapping members, or a joint or seam between interconnected portions of two abutting members) with a liquid sealant.

Conventionally, to implement such a sealing method, a dispensing gun filled with a liquid sealant is manually moved so that its discharge port runs along the region of the structural body to be sealed. A cartridge that is pre-filled with the liquid sealant is loaded in the dispensing gun, and the dispensing gun extrudes a desired quantity of the liquid sealant towards a target site by driving this cartridge using a high-pressure gas source or a motor.

In this conventional sealing method, however, there is a problem in that, if the person applying the sealant is not proficient, the cross-sectional shape of the sealant actually applied to the structural body will vary at different locations, and the actual performance of the sealant may not be stable.

In contrast, below-identified Patent Document No. 1 discloses products that should also be designated as "premolded sealants."

The present co-inventors researched such pre-molded sealants, and as a result, obtained the following information.

Specifically, the present co-inventors discovered the advantage in that, by injection molding an elongated product that extends continuously as a pre-molded sealant (i.e., a solid sealant), the product can be freely designed in any desired shape (e.g., unlike with extrusion molding, the cross section can be varied at any position).

Furthermore, the co-inventors also discovered a potential risk in that, during the injection molding process, gasses within a mold unit or within a raw material are possible and thus defects, such as recesses or voids, may occur in the final product.

Below-identified Patent Document No. 2 provides a vent in an upper mold of a mold unit for injection molding, attaches a filter to the vent, and thereby prevents the ingress of molding material into the vent.

Additionally, below-identified Patent Document Nos. 3-6 are references related to the present techniques.

PRIOR-ART REFERENCES

Patent Documents

Patent Document No. 1: Japanese Utility Model Application Publication Jitsu-Ko-Syo No. 63-9689
Patent Document No. 2: Japanese Patent Application Publication No. 2012-66533
Patent Document No. 3: Japanese Utility Model Application Publication Jitsu-Kai-Syo No. 59-192315
Patent Document No. 4: Japanese Patent Application Publication No. 2008-524038
Patent Document No. 5: Japanese Patent Application Publication No. 2011-156758
Patent Document No. 6: Japanese Patent Application Publication No. 2014-28498

SUMMARY OF THE INVENTION

However, when a viscous material is used as a raw material, although gasses pass through the gas vent, the above-identified Patent Document No. 2 fails to disclose the implementation of filtering such that the viscous material does not pass through, without using a filter as an additional component.

With those circumstances in mind, a technology for injection molding a product is disclosed herein that reduces the risk that defects, such as recesses or voids, may occur in the final product due to gasses within the mold unit or the raw material.

The following representative, non-limiting modes are disclosed herein. The following modes will be stated below such that these modes are divided into sections and are numbered, and such that these modes depend upon other mode(s), where appropriate. This facilitates a better understanding of some of the plurality of technical features and the plurality of combinations thereof disclosed in this specification, and does not mean that the scope of these features and combinations should be interpreted to limit the scope of the following modes of the invention. That is to say, it should be interpreted that it is allowable to select the technical features, which are stated in this specification but which are not stated in the following modes, as technical features of the invention.

Furthermore, reciting herein each one of the selected modes of the invention in a dependent form so as to depend from the other mode(s) does not exclude the possibility of the technical features in the dependent-form mode from becoming independent of those in the corresponding dependent mode(s) and to be removed therefrom. It should be interpreted that the technical features in the dependent-form mode(s) may become independent according to the nature of the corresponding technical features, where appropriate.

(1) An injection molding apparatus that injection molds an elongate product using a viscous material as a raw material, comprising:

a mold unit including a first mold and a second mold, and a gas vent formed in at least one of the first mold and the second mold, wherein the first mold and the second mold cooperate to define an elongate cavity having a shape that replicates the desired shape of the elongate product, and the gas vent is formed in the at least one of the first mold and the second mold at a position spaced apart from a mating surface of the opposing mold, and is formed continuously or intermittently along an endless line that extends in a direction having a component extending in parallel to a longitudinal direction of the cavity.

(2) The injection molding apparatus according to mode (1), wherein the gas vent is formed in a gap between a plurality of parts of the at least one of the first mold and the second mold, or as a slit or an array of through holes integrally formed in the at least one of the first mold and the second mold.

(3) The injection molding apparatus according to mode (1) or (2), further comprising:

an injection inlet port for the viscous material formed at one end of the cavity; and an injection outlet port for the viscous material formed at another end of the cavity, wherein the endless line extends such that it externally encircles both of the injection inlet port and the injection outlet port.

(4) The injection molding apparatus according to mode (3), wherein the endless line includes a pair of linear segments that extend in a direction having a component in parallel to the longitudinal direction of the cavity, and a pair of curved segments externally surrounding the injection inlet port and the injection outlet port, respectively.

(5) The injection molding apparatus according to any one of modes (1)-(4), wherein the gas vent is brought into contact with the raw material when the cavity is fully or partially filled with the raw material.

(6) The injection molding apparatus according to any one of modes (1)-(5), wherein:

at least one of the first mold and the second mold is divided into a main body having a through hole extending longitudinally along the cavity, and a plug that is non-airtightly fitted into the through hole extends longitudinally along the cavity, and in the assembled state of the main body and the plug, a gap between the main body and the plug forms the endless line, and the gap functions as the gas vent.

(7) The injection molding apparatus according to mode (6), further comprising:

an injection inlet port for the viscous material formed at one end of the cavity; and an injection outlet port for the viscous material formed at another end of the cavity, wherein the injection inlet port and the injection outlet port are respectively disposed at the two longitudinal-direction ends of the plug.

(8) The injection molding apparatus according to mode (6) or (7), wherein:

the product has a hollow portion that extends in the longitudinal direction at at least one position in its longitudinal direction, the mold unit includes a core for forming the hollow portion, and the core is attached to the plug.

(9) An injection molding method that injection molds an elongate product using a viscous material, which is a thermosetting synthetic resin, as a raw material, comprising:

a plug mounting step that mounts a plug that fits in a state that is not airtight in a through-hole formed in at at least one of a first mold and a second mold that constitute a mold unit defining an elongate cavity;

a clamping step that clamps the first mold and the second mold together;

a filling step that injects the viscous material into the cavity through an upstream port of the cavity and thereby fills the cavity with the viscous material, while degassing the viscous material through a gas vent formed by fitting the plug in the through-hole in a state that is not airtight;

a curing step that heats the mold along with the viscous material filled therein, without pressurization, thereby curing and molding the viscous material; and after curing of the viscous material, a removal step that releases the clamp, separates the mold unit, and removes the elongate product from the mold unit.

(10) An injection molding apparatus that injection molds an elongate product using a viscous material as a raw material, comprising:

a mold unit that defines an elongate cavity having a shape that replicates the desired shape of the elongate product, wherein the mold unit comprises:

an injection inlet port for the viscous material formed in one end of the cavity;

an injection outlet port for the viscous material formed in another end of the cavity; and a gas vent extending generally linearly between a vicinity of the injection inlet port and a vicinity of the injection outlet port.

(11) A method that injection molds an elongate product using a viscous material as a raw material, wherein the method is implemented using a mold unit that defines an elongate cavity having a shape that replicates the desired shape of the elongate product, wherein the mold unit comprises:

an injection inlet port for the viscous material formed at one end of the cavity;

an injection outlet port for the viscous material formed at another end of the cavity; and a gas vent extending generally linearly between a vicinity of the injection inlet port and a vicinity of the injection outlet port, the method comprising:

a step that injects the viscous material into the cavity through the injection inlet port, thereby gradually filling the space within the cavity with the viscous material from an upstream side to a downstream side;

a step that discharges gasses previously-accumulated within the cavity through the gas vent and the injection outlet port by using the viscous material during the filling as the viscous material is injected; and after the mold unit is filled with the viscous material, a step that cures and molds the viscous material.

(12) An injection molding apparatus that injection molds an elongate product using a viscous material as a raw material, comprising a mold unit that defines an elongate cavity having a shape that replicates the desired shape of the elongate product, wherein the mold unit has an injection inlet port for the viscous material at one end of the cavity, and an injection outlet port for the viscous material at an opposite end of the cavity, whereby the viscous material is able to flow within the cavity from an upstream side to a downstream side in the length direction of the cavity, the mold unit has a gas vent configured to allow gasses within the cavity and gasses within the viscous material to be evacuated as the viscous material advances within the cavity, the gas vent extends continuously or discontinuously in a direction having a component extending in parallel to the length direction of the cavity, while penetrating through the mold unit in a thickness direction to permit intercommunication of an internal space with an external space of the cavity, and the gas vent has a shape such that the gasses are vented through but the viscous material is retained due to fluidity resistance of the viscous material resulting from its viscosity, thereby allowing the gas vent to perform filtering in addition to the degassing.

(13) The injection molding apparatus according to mode (12), wherein the gas vent is formed as a gap between a plurality of parts of the mold unit, or as a slit or an array of through holes integrally formed in the mold unit, and the gap, the slit or the array of through holes extends, in a plan view of the mold unit, from the same position as or near the injection inlet port to the same position as or near the injection outlet port.

(14) The injection molding apparatus according to mode (13), wherein the gap, the slit or the array of through holes extends in a thickness direction of the mold unit with a cross section that is formed, in a plan view of the mold unit, as a continuous or discontinuous endless line that encircles the injection inlet port and the injection outlet port altogether.

(15) The injection molding apparatus according to mode (14), wherein the continuous or discontinuous endless line includes a pair of linear segments that extend in a direction having a component in parallel to the longitudinal direction of the cavity, and a pair of curved segments that externally surround the injection inlet port and the injection outlet port, respectively.

(16) The injection molding apparatus according to mode (15), wherein:

the gap, the slit or the array of through holes extends in a thickness direction of the mold unit with a cross section that is formed, in a plan view of the mold unit, as a continuous or discontinuous endless line that encircles the injection inlet port and the injection outlet port altogether, the continuous or discontinuous endless line includes a pair of linear segments that extends in a direction having a component in parallel to the longitudinal direction of the cavity, and a pair of curved segments that externally surround the injection inlet port and the injection outlet port, respectively, and the gap, the slit or the array of through holes is brought into contact with the raw material when the cavity is fully or partially filled with the raw material.

(17) The injection molding apparatus according to any one of modes (12)-(16), wherein:

the mold unit includes a first mold and a second mold that can be shifted between a state separated from each other and a state engaged with each other, the first mode and the second mode cooperating to define the cavity, at least one of the first mold and the second mold is segmented, in a plan view of the mold unit, into a main body having a through hole having an elongate-hole-shaped cross-section extending longitudinally along the mold unit, and a plug having an elongate cross-section that fits in the through hole in a non-airtight state, and in the assembled state of the main body and the plug, at least a portion of the gap between the main body and the plug functions as the gas vent.

(18) The injection molding apparatus according to mode (17), wherein the injection inlet port and the injection outlet port are respectively disposed at the two longitudinal-direction ends of the plug.

(19) The injection molding apparatus according to any one of modes (12)-(18), wherein:

the mold unit includes a first mold and a second mold that can be shifted between a state separated from each other and a state engaged with each other, the first mold and the second mold cooperating to define the cavity, at least one of the first mold and the second mold is segmented into at least two portions, in the assembled state of these two portions at least a portion of a gap between these two portions extends longitudinally along the mold unit, and at least this portion of the gap functions as the gas vent.

(20) The injection molding apparatus according to any one of modes (12)-(19), wherein:

the product has a cutout (notch) disposed in a cross section at at least one position in the longitudinal direction thereof, and the mold unit has a part for forming the cutout.

(21) The injection molding apparatus according to mode (20), wherein:

the cutout extends in the longitudinal direction of the product, and the cutout of the product is to be attached to a continuously-extending edge of a structural body.

(22) The injection molding apparatus according to any one of modes (12)-(21), wherein:

the product has a hollow portion (recess, slit) or hollow portions (recesses, slits) that extend(s) in the longitudinal direction at at least one position in the longitudinal direction thereof, and the mold unit has a core for forming the hollow portion.

(23) The injection molding apparatus according to mode (22), wherein the hollow portion is a linear array of hollow portions spaced apart from each other.

(24) The injection molding apparatus according to any one of modes (12)-(23), wherein:

the mold unit includes a first mold and a second mold that can be shifted between a state separated from each other and a state engaged with each other, the first mold and the second mold cooperating to define the cavity, the injection molding apparatus further comprising a clamp device that clamps the first mold and the second mold together in the state in which they have been mated with each other.

(25) An injection molding apparatus that injection molds an elongate product using a viscous material as a raw material, comprising a mold unit that defines an elongate cavity having a shape that replicates the desired shape of the elongate product, wherein the mold unit has an injection inlet port for the viscous material at one end of the cavity, and an injection outlet port for the viscous material at an opposite end of the cavity, whereby the viscous material is able to flow within the cavity from an upstream side to a downstream side in the length direction of the cavity, and the mold unit is held obliquely or vertically in an orientation in which the upstream side of the flow of the raw material is located above the downstream side, or an orientation in which the upstream side of the flow of the raw material is located below the downstream side.

(26) The injection molding apparatus according to mode (25), wherein the mold unit has a gas vent configured to allow gasses within the cavity and gasses within the viscous material to be evacuated as the viscous material advances within the cavity, and the gas vent is disposed on an upper surface or a lower surface of the cavity.

(27) An injection molding method that injection molds an elongate product using a viscous material, which is a thermosetting synthetic resin, as a raw material, comprising:

a clamping step that clamps a first mold and a second mold constituting a mold unit having a longitudinally-shaped cavity;

a filling step that injects the viscous material into the cavity through an upstream port of the cavity and thereby fills the cavity with the viscous material, while degassing the viscous material through a gas vent of the mold unit;

a curing step that heats the mold along with the viscous material filled therein, without pressurization, thereby curing and molding the viscous material; and after curing of the viscous material, a removal step that releases the clamp, separates the mold unit, and removes the elongate product from the mold unit.

(28) A sealing method that fills a gap formed between overlapping two plates with a sealant, comprising:

a step that prepares a pre-molded sealant;

a step that attaches the prepared pre-molded sealant to an elongate edge of one of the two plates that extends generally in parallel to the gap in a state in which the gap is exposed; and a step that applies a liquid sealant to the exposed gap, such that the attached pre-molded sealant is at least partially covered with the liquid sealant.

(29) An injection molding apparatus that injection molds an elongate product using a viscous material as a raw material, comprising a mold unit that defines an elongate cavity having a shape that replicates the desired shape of the elongate product, wherein the mold unit has a gas vent configured to allow gasses within the cavity and gasses within the viscous material to be evacuated as the viscous material flows within the cavity.

(30) An injection molding apparatus that injection moldings an elongate product using a viscous material as a raw material, comprising a mold unit that defines an elongate cavity having a shape that replicates the desired shape of the elongate product, wherein the mold unit has a swirl-imparting part that imparts a swirl to the flow of the viscous material as the viscous material is injected into the cavity.

DETAILED DESCRIPTION OF THE INVENTION

In the following, some illustrative embodiments of the present teachings will be described in more detail with reference to the drawings.

To begin with, an injection molding apparatus according to a first illustrative embodiment will be described; next, an injection molding method for manufacturing an elongate product using the injection molding apparatus will be described; and then, a sealing method implemented by using the manufactured elongate product as a pre-molded sealant will be described.

Overall Configuration of the Injection Molding Apparatus

Figure 1:
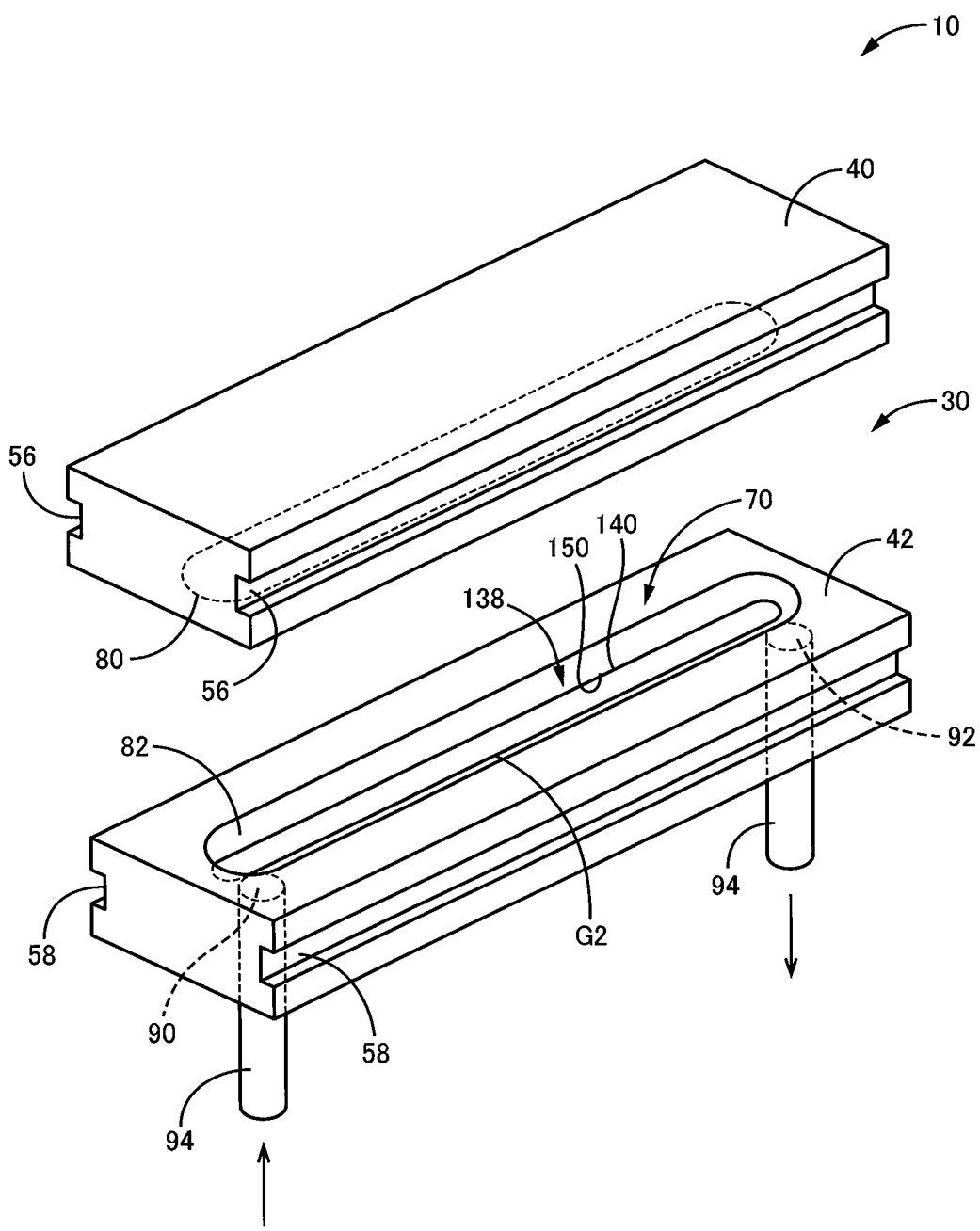
FIG. 1 is an exploded perspective view of a mold unit of an injection molding apparatus according to one illustrative embodiment of the present teachings.

In FIG. 1, an injection molding apparatus 10 according to an embodiment of the present teachings is illustrated in an exploded perspective view. The injection molding apparatus 10 is designed for injection molding an elongate product 12 using a viscous material, which is a thermosetting synthetic resin (e.g., a filled modified polysulfide resin), as a raw material (e.g., a material to be molded). As an alternative raw material, a material other than a thermosetting synthetic resin may be used with the addition of a curing agent.

Throughout the present disclosure, the term "elongate" should be interpreted to encompass rod-shaped products having a length dimension that is longer than a width dimension (e.g., oval- or rectangular-shapes, in a side view).

Prior to injection into the injection molding apparatus 10, the raw material is fluid and does not conspicuously exhibit its own shape. Therefore, the injection molding apparatus 10 is fundamentally different in concept from an apparatus that effects compression molding that compresses a material, which has a definite shape prior to entering the mold unit, and forms it into a desired shape.

Figure 2:
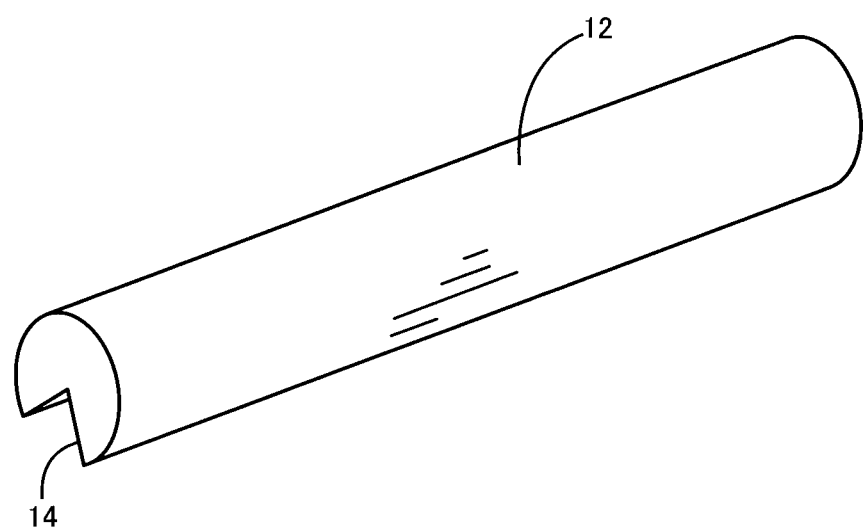
FIG. 2 is a perspective view of an illustrative example of a product to be manufactured using the mold unit depicted in FIG. 1.

In FIG. 2, an illustrative example of the product 12 is illustrated in a perspective view. Although this product 12 extends rectilinearly with generally circular-shaped cross-sections, any one of the cross-sections has a shape in which a fan shaped part, in which a central angle is a right angle (instead of this, the central angle also may be an angle larger or smaller than a right angle) has been cut out. In other words, the product 12 has a cutout (notch) 14 formed in the shape of a fan having an angle of 90 degrees.

As described above, the product 12 has the cutout 14 at a cross section located at at least one position along its length. For this reason, as described below with reference to, for example, FIG. 13, the injection molding apparatus 10 has a portion for forming the cutout 14 (a triangular cross-sectioned part 160 as described below).

The cutout 14 extends in the length direction of the product 12. In one exemplary usage, as illustrated in FIG. 3, the product 12 is attached at the cutout 14 to a continuously extending edge 18 of a structural member (made of metal, synthetic resin, etc.) 16.

More specifically, as illustrated in FIG. 3, an example of the application of this product 12 is a pre-molded sealant. For example, the product 12 is externally mounted and affixed, by applying and interposing an adhesive, to an edge 18, in which the cross-section has an angle of 90 degrees, of the structural member 16, such as a plate material or block material. This sealing process will be described below in more detail.

Figure 4:
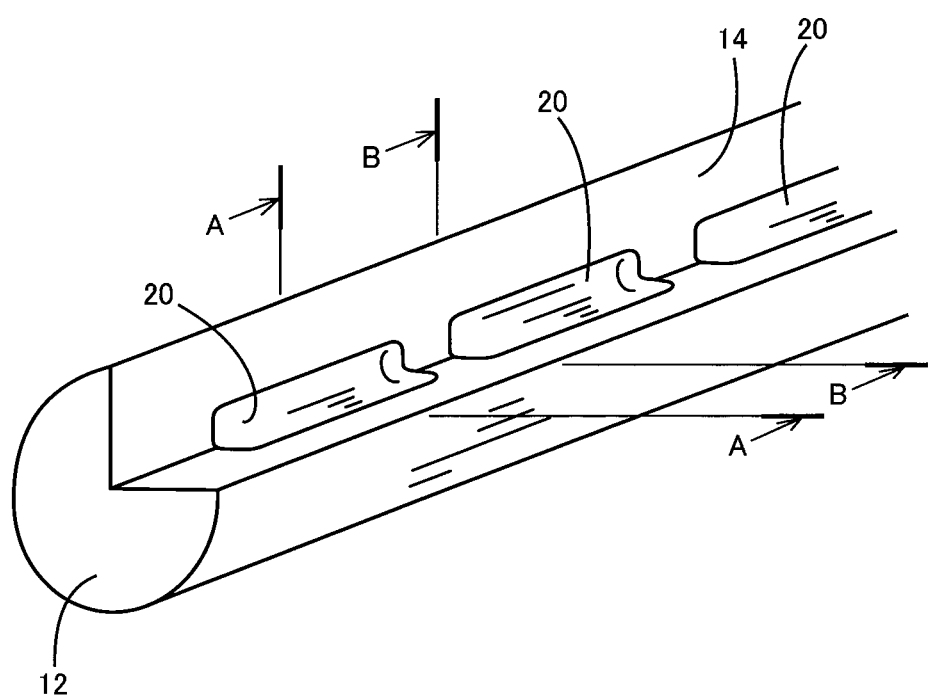
FIG. 4 is a perspective view of an illustrative example of a shape of the interior of the product depicted in FIG. 2.
Figure 5A:
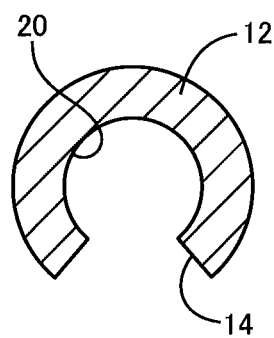
FIG. 5A is a cross-sectional view taken along line A-A in FIG. 4.

In FIG. 4, the product 12 is more specifically illustrated in a perspective view. As illustrated in FIG. 4, hollow portions (recesses, slits) 20 are arranged in a row, spaced apart from each other, along a central portion of the cutout 14 within the product 12. As illustrated in FIG. 5A, each of the hollow portions 20 has a cylindrical shape that extends concentrically to the central portion of the product 12.

In FIG. 5A, within the product 12 illustrated in FIG. 4, a cross section of one of its segments (Section A-A in FIG. 4) is shown that has a hollow portion 20 in the center portion. On the other hand, in FIG. 5B, within the product 12 illustrated in FIG. 4, a cross section of another segment (Section B-B in FIG. 4) is shown that does not have a hollow portion 20 in the central portion.

In FIG. 4, the plurality of hollow portions 20 may be used, for example, as pockets that store (contain) adhesive in advance of being adhered, e.g., to an edge 18 of a structural member 16.

In this usage example, adhesive is applied by a worker in advance to surfaces of the edge 18 of the structural member 16 to form a relatively thin adhesive layer on each surface; adhesive is applied in advance onto the product 12 not only on surfaces of the cutout 14 to form a relatively thin adhesive layer on each surface, but also a relatively large volume of the adhesive is filled into the hollow portions 20 in advance.

In this usage example, the material of the adhesive is more flexible than the material of the product 12 (even if it is made of the same material as that of the adhesive). For this reason, the adhesive easily adapts to the surface irregularities of the edge 18, and similarly, the adhesive also easily adapts to the surface irregularities of segments of the product 12 which form the hollow portions 20. As a result, the adhesive can exhibit an effective anchoring effect for both the product 12 and the edge 18.

Thereafter, the product 12 is attached by the worker to the edge 18 of the structural member 16. As a result, the adhesive, thanks to the effective anchoring effect, firmly affixes to both the product 12 and the edge 18. As a result, the product 12 and the edge 18 are firmly affixed together via the adhesive.

As described above, the product 12 has the hollow portion(s) 20 extending longitudinally at at least one position along its length. For this reason, the injection molding apparatus 10 has a portion or portions for forming the hollow portion(s) 20 (core(s) 132), as will be described below in more detail with reference to, for example, FIG. 8.

In the example depicted in FIG. 4, the multiple hollow portions 20 are aligned in a row so as to be spaced apart from each other. For this reason, multiple cores 132 also are aligned in a row so as to be spaced apart from each other, as will be described below in more detail with reference to, for example, FIG. 8.

Configuration of the Mold Unit

As illustrated in FIG. 1, the injection molding apparatus 10 includes an elongate mold unit 30. Although this mold unit 30 is a split type in the present embodiment, it also may be integrally formed.

The mold unit 30 includes a first mold 40 and a second mold 42 that are shiftable between a state, in which they are separated from each other, and a state, in which they are engaged with each other. The first mold 40 and the second mold 42 are both made of a synthetic resin; and more specifically, they are made of Teflon® (polytetrafluoroethylene) or POM (polyoxymethylene) as a synthetic resin that has a high surface release property. The first mold 40 and the second mold 42 are both manufactured using a synthetic resin having the surface release properties of Teflon® or POM.

As illustrated in FIG. 1, although the first mold 40 and the second mold 42 are both formed as an elongated shape that extends along a single straight line, instead thereof, the first mold 40 and the second mold 42 may be both formed, e.g., as an elongated shape that extends along a centerline that includes a single arc or a single curved line defined by a plurality of arcs that are interconnected.

Configuration of the Clamping Device

Figure 6:
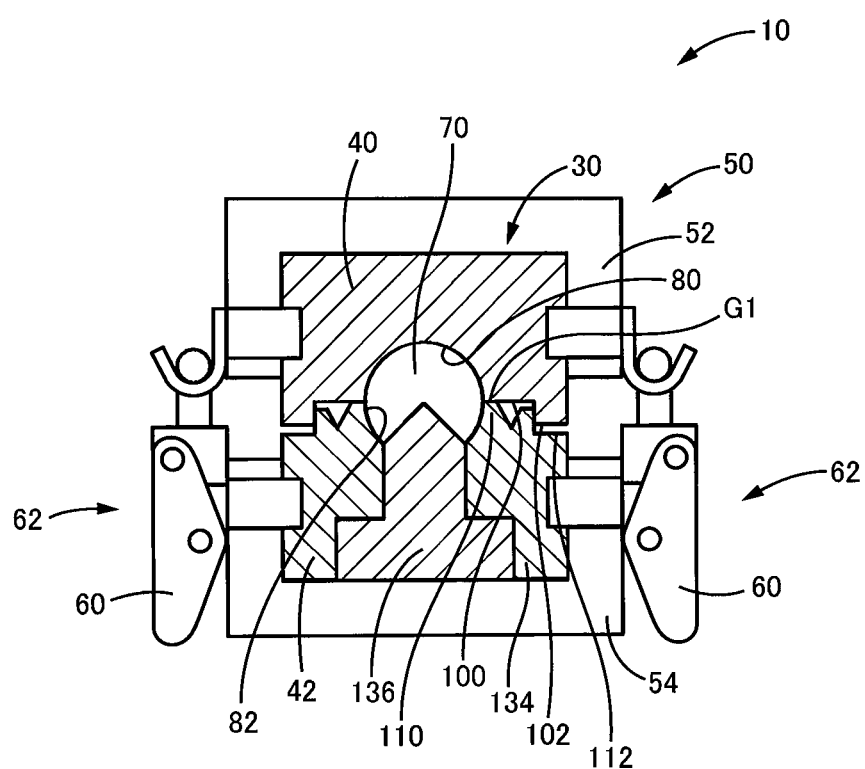
FIG. 6 is a cross-sectional front view of the injection molding apparatus incorporating the mold unit depicted in FIG. 1 and a clamping device.

As illustrated in FIG. 6 in a cross-sectional front view, the injection molding apparatus 10 further includes a clamping device 50 that clamps the first mold 40 and the second mold 42 in the mated together state.

The clamping device 50 includes a first clamp 52 that holds the first mold 40 and a second clamp 54 that holds the second mold 42. The first clamp 52 engages in a pair of sidewall grooves 56, 56 of the first mold 40 that are illustrated in FIG. 1 (although each sidewall groove 56 is, for example, a linear groove, they may be non-linear grooves as well. In addition, although they are, for example, horizontal grooves, they may be non-horizontal grooves as well). On the other hand, the second clamp 54 engages in a pair of sidewall grooves 58, 58 of the second mold 42 that are illustrated in FIG. 1 (although each sidewall groove 58 is, for example, a linear groove, they may be non-linear grooves as well. In addition, although they are, for example, horizontal grooves, they may be non-horizontal grooves as well).

The first clamp 52 and the second clamp 54 are releasably engaged with each other. The first clamp 52 and the second clamp 54 are shiftable between a mold-clamped state, in which they are engaged with each other and the mold unit 30 is closed, and a mold-open state, in which they are released from each other and the mold unit 30 is released (can be opened).

As illustrated in FIG. 6, at least one locking device 62, which includes a manipulation part (e.g., manipulatable lever(s) 60) that is manipulatable by a worker, is provided for shifting the engagement state of the first clamp 52 and the second clamp 54 between the released state and the engaged state.

Figure 7:
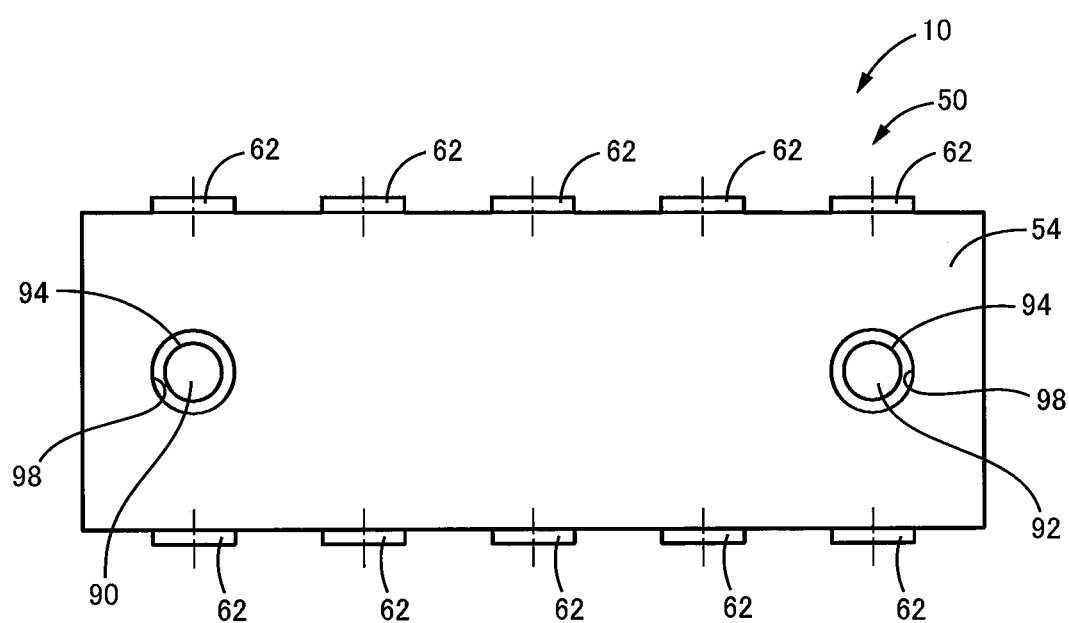
FIG. 7 is a bottom view of the injection molding apparatus depicted in FIG. 6.

In FIG. 7, the bottom face of the second clamp 54 is illustrated. On the second clamp 54, multiple (e.g., five) locking devices 62 are arranged spaced about evenly apart from each other on each of a pair of side faces that extend in the longitudinal direction. Although not illustrated, similar thereto, multiple (e.g., five) locking devices 62 are arranged spaced about evenly apart from each other on the first clamp 52 as well, on each of a pair of side faces that extend in the longitudinal direction.

Configuration of the Cavity

As illustrated in FIG. 1, when in the state of being engaged together, the first mold 40 and the second mold 42 together define an elongate cavity 70 (see FIG. 6) having a shape that replicates the desired shape of the product 12. The first mold 40 has a first hollow portion 80 that is elongate, and similarly, the second mold 42 has a second hollow portion 82 that is elongate; the cavity 70 is defined by combining the first hollow portion 80 and the second hollow portion 82.

Figure 9:
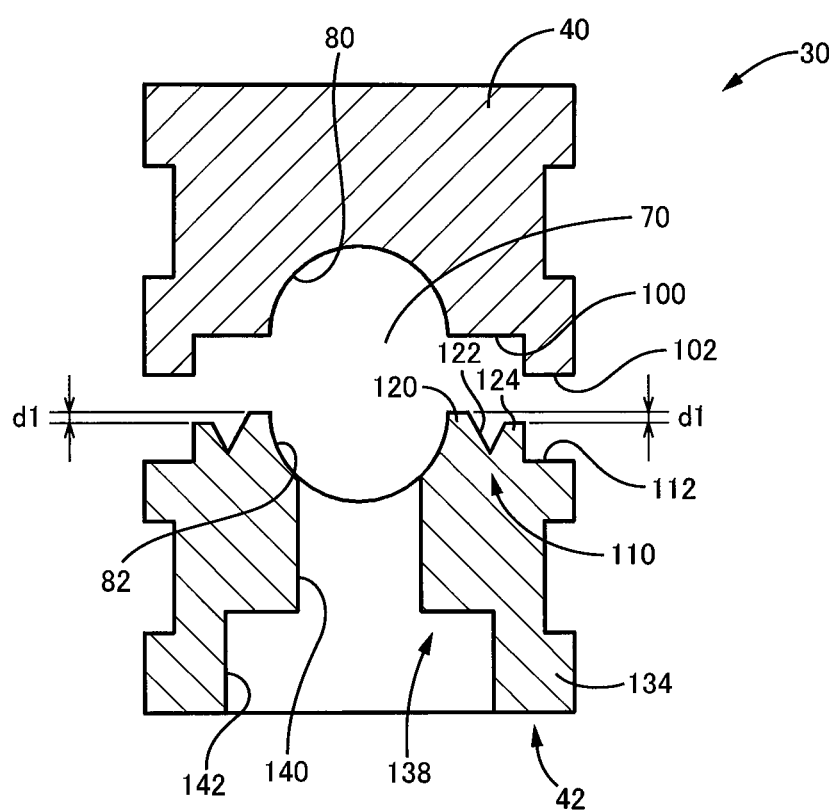
FIG. 9 is an enlarged cross-sectional front view of the mold unit depicted in FIG. 8 having its second mold having an outer piece and an inner piece, with the inner piece detached from the second mold.

In an example illustrated in FIGS. 6, 9 and 13, both the first hollow portion 80 and the second hollow portion 82 have a shape that extends rectilinearly with a semi-circular cross-section; when the first mold 40 and the second mold 42 are brought into mutual engagement, those two semi-circular cross-sections are united into a single circular cross-section by uniting their diameters; as a result, the basic cross-section of the cavity 70 becomes circular.

As illustrated in FIG. 1, the first mold 40 and/or the second mold 42 has (have) an injection inlet port 90 for the raw material at one end of the cavity 70, and an injection outlet port 92 at the other end of the cavity 70; as a result, it is possible for the raw material to flow within the cavity 70 from the upstream side to the downstream side along the longitudinal direction of the cavity 70.

In this regard, to explain the definitions of some terms, the "one end" and the "other end" may be interpreted to mean both longitudinal end faces of the cavity 70 in some cases, both side-face-end-vicinities that are portions of the side faces of the cavity 70 which are near the end faces of the cavity 70 in other cases, and portions of the cavity 70 which span between the end faces and the side-face-end-vicinities of the cavity 70 in still other cases.

The raw material is injected into the cavity 70 through the injection inlet port 90. As the volume of the raw material held within the cavity 70 increases, gas (e.g., an air) present therein is displaced from the cavity 70; as a result, a portion of the excess gas is forced out through the injection outlet port 92.

With regard to the injection inlet port 90 and the injection outlet port 92, both may be formed in the first mold 40, both may be formed in the second mold 42, or they may be formed in different molds, such that one is in the first mold 40 and the other is in the second mold 42.

In an example of the second mold 42 depicted in FIG. 1, both of the injection inlet port 90 and the injection outlet port 92 are formed in the second mold 42. Multiple (e.g., two) conduits 94 (e.g., flexible tubes, rigid pipes) are installed in communication with the injection inlet port 90 and the injection outlet port 92, respectively, and these multiple conduits 94 respectively penetrate through multiple through-holes 98, 98 (see FIG. 7) formed in the second clamp 54 that holds the second mold 42.

As illustrated in FIG. 1, the injection inlet port 90 is disposed at the first hollow portion 80 of the first mold 40 and/or at the second hollow portion 82 of the second mold 42, such that the injection inlet port 90 is as distant as possible longitudinally away from the center of the first hollow portion 80 and/or the second hollow portion 82. Similarly, the injection outlet port 92 is disposed at the first hollow portion 80 of the first mold 40 and/or at the second hollow portion 82 of the second mold 42, such that the injection outlet port 92 is as distant as possible longitudinally away from the center of the first hollow portion 80 and/or the second hollow portion 82.

As a result, the raw material fills everywhere within the cavity 70 from the upstream end to the downstream end, thereby facilitating the wetting of the entire surface of the cavity 70 without omission.

Swirling Injection of Raw Material

Although not illustrated, in order to facilitate smooth passage of the raw material within the conduits 94, 94 that are narrower than the cavity 70, a swirl-imparting part may be added to the inner circumferential surface(s) of the conduit(s) 94 (e.g., the conduit 94 for the injection inlet port 90) to impart swirling (transverse vortices around the direction of travel) to the raw material. One example of such a swirl-imparting part is a spiral groove or spiral grooves formed on the inner circumferential surface(s) of the conduit(s) 94, 94; another example is a slanted guide plate or guide plates attached to the inner circumferential surface(s) of the conduit(s) 94.

When the raw material is injected into the cavity 70 in a swirling flow, the raw material is filled more smoothly into the cavity 70 than when the raw material is forced into the cavity 70 in a non-swirling flow (e.g., a rectilinearly). As a result, due to the fact that the raw material becomes turbulent because it is forcibly pushed into the cavity 70, the possibility that the raw material entrains ambient gasses is reduced. For this reason, in a raw material that was degassed before the injection, gases do not admix during the injection into the cavity 70.

Structural Details of the Mold Unit

Figure 8:
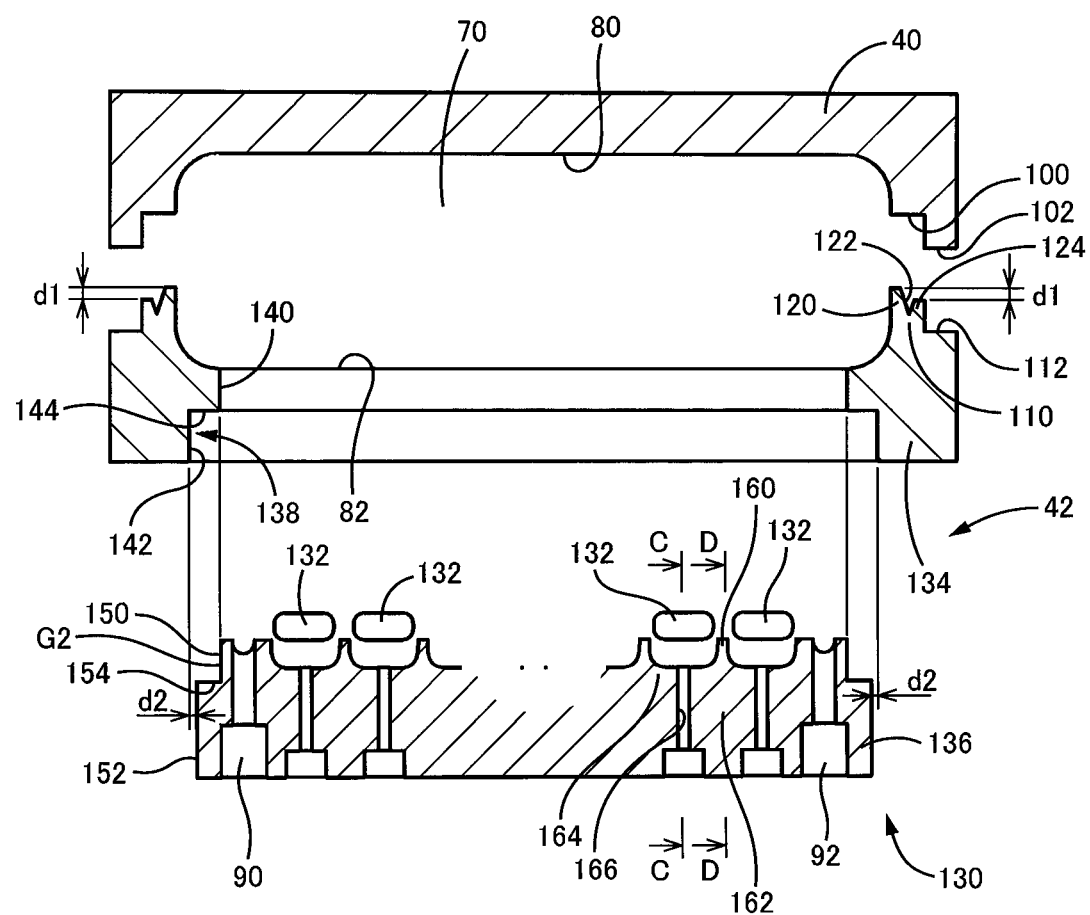
FIG. 8 is an exploded cross-sectional side view of the mold unit depicted in FIG. 1.

In FIG. 8, the mold unit 30 is illustrated in an exploded cross-sectional side view. The first mold 40 has the first hollow portion 80 extending with a cross section generally in the form of a semi-circle, and the first hollow portion 80 is open towards the side of the second mold 42. The surface of the first mold 40 that opposes the second mold 42 externally surrounds the open surface of the first hollow portion 80, externally surrounds an inner recess 100 shaped as an elongated ring and has an outer ridge 102 shaped as an elongated ring.

Similarly, the second mold 42 has the second hollow portion 82 extending with a cross section generally in the form of a semi-circle, and the second hollow portion 82 is open towards the side of the first mold 40. The surface of the second mold 42 that opposes the first mold 40 externally surrounds the open surface of the second hollow portion 82, externally surrounds an inner ridge 110 shaped as an elongated ring and has an outer recess 112 shaped as an elongated ring.

As illustrated in FIG. 6, in a state (i.e., the mold-clamped state) in which the first mold 40 and the second mold 42 engage with each other, the inner recess 100 of the first mold 40 partially contacts the inner ridge 110 of the second mold 42, while the outer ridge 102 of the first mold 40 is close to, but not in contact with, the outer recess 112 of the second mold 42.

As a result, the first mold 40 with the second mold 42 engage with each other owing to the partial contact between the inner recess 100 and the inner ridge 110; at this time, the mating surface of the first mold 40 is the surface of the portion of the inner recess 100 that is in partial contact with the inner ridge 110, while the mating face of the second mold 42 is the surface of that portion of the inner ridge 110 that is in partial contact with the inner recess 100.

The mating surface of the first mold 40 and the mating surface of the second mold 42 mate with each other in the state in which the first mold 40 and the second mold 42 are engaged with each other. At this time, while the center point of the semi-circular cross-section of the first hollow portion 80 is located on the mating surface of the first mold 40, the center of the semi-circular cross-section of the second hollow portion 82 is located on the mating surface of the second mold 42; in addition, the center point of the semi-circular cross-section of the first hollow portion 80 and the center point of the semi-circular cross-section of the second hollow portion 82 coincide with each other. The position of this coincident center point coincides with the center point of the circular cross-section, which is a basic cross-section of cavity 70.

As described above, the mating surface of the first mold 40 and the mating surface of the second mold 42 are not in airtight contact with each other over a large area, but are in contact with each other over a small area and, when the synthetic resin parts come into contact with each other, in a state in which a normal gap remains therebetween.

More specifically, the inner recess 100 of the first mold 40 has a horizontally-extending flat surface that is opposite of the second mold 42, while the inner ridge 110 of the second mold 42 has a horizontally-extending uneven surface that is opposite of the first mold 40.

The uneven surface includes: an inner annular crest 120 having a horizontal, flat top face at the innermost position; an annular groove 122 having an inverted-triangular cross-section that is recessed with a steep slope outside thereof; and an outer annular crest 124 having a horizontal, flat top face outside thereof, which is higher than the bottommost position of the annular groove 122 and is lower than the top face of the inner annular crest 120. The height difference between the top face of the inner annular crest 120 and the top face of the outer annular crest 124 is denoted by d1, whose length is larger than 0 (e.g., about 0.5 mm).

As illustrated in FIGS. 8 and 9, the height distance d1 is present in an annular shape so as to surround the entire outer circumference of the cavity 70. The top face of the inner annular crest 120 may have a width that is equal to, smaller than or larger than that of the outer annular crest 124.

Configuration of the First Gas Vent

Along the inner annular crest 120, the second mold 42 is contact with the inner recess 100 of the first mold 40 more strongly than at other portions of the second mold 42, and via a gap G1 (e.g., about 0 mm to about 0.1 mm), which is smaller than at other portions.

In this contact state, however, although it is possible for gasses within the cavity 70 to vent spontaneously from the cavity 70 to the outside through the gap G1 between the inner annular crest 120 of the second mold 42 and the inner recess 100 of the first mold 40, it is impossible for the raw material within the cavity 70 to vent from the cavity 70 to the outside through the gap G1 because the gap G1 is small relative to the viscous resistance thereof.

The gap G1 is created when flat surfaces of rigid bodies (i.e., the inner annular crest 120 of the second mold 42 and the inner recess 100 of the first mold 40) made of Teflon® or other synthetic resin materials exhibiting mechanical properties equivalent to those of Teflon® are in contact.

In this regard, in an example, each of the surfaces of the inner annular crest 120 of the second mold 42 and the inner recess 100 of the first mold 40 have a surface roughness that is rougher than the surfaces of the portions of the first mold 40 and the second mold 42 that define the cavity 70. For example, the surface of the cavity 70 is a fine-mirror finish, while the surfaces of the inner annular crest 120 of the second mold 42 and the inner recess 100 of the first mold 40 are a normal finish.

Therefore, each of the surfaces of the inner annular crest 120 of the second mold 42 and the inner recess 100 of the first mold 40 has fine irregularities; as a result, for example, even if the dimension of the gap G1 on the design drawing is 0 mm, a gap G1 is realized that allows gasses to permeate through, but the viscous material does not to permeate through.

Therefore, the gap G1 between the inner annular crest 120 of the second mold 42 and the inner recess 100 of the first mold 40 functions as the aforementioned gas vent (a first gas vent) that carries out degassing and filtering. This gap G1 exists in an annular shape on the mold-mating-surfaces of the first mold 40 and the second mold 42 so as to enclose the entire outer circumference of the cavity 70.

Structural Details of the Second Mold

As illustrated in FIG. 8, although the first mold 40 is made of a single piece, the second mold 42 is made of a main body 130 and multiple cores 132; furthermore, the main body 130 is divided into an outer piece 134 and an inner piece 136.

Figure 10:
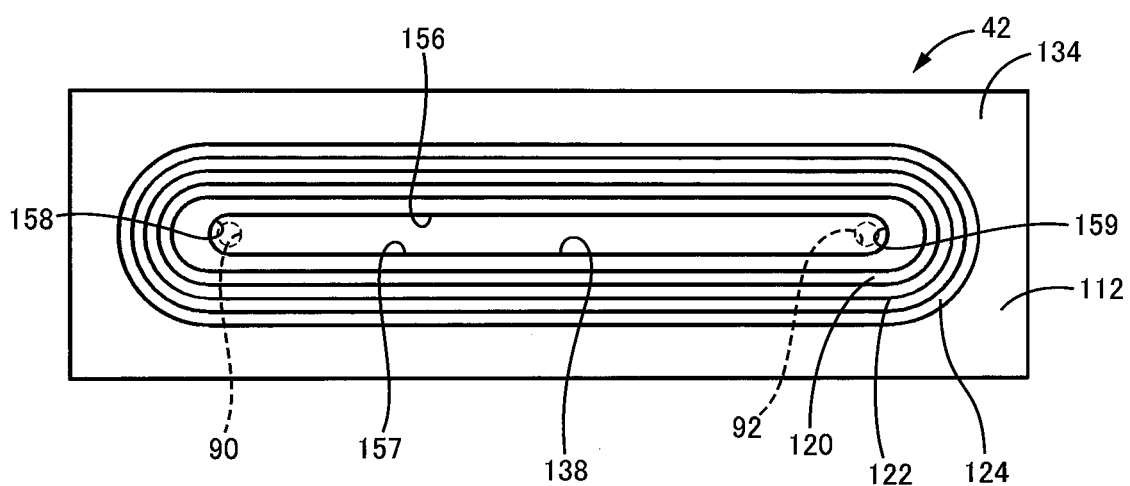
FIG. 10 is a top plan view of the second mold depicted in FIG. 8.

As illustrated in FIGS. 8 and 10, the outer piece 134 has an elongated through-hole 138 that extends in the longitudinal direction thereof (in top plan view, it coincides with the small-sized inner circumferential surface 140 depicted in FIG. 13). One example of the elongated through-hole 138 extends along a longitudinal centerline of the outer piece 134. The elongated through-hole 138 may be in the form of a slotted hole or a longitudinally extending hole in top plan view.

As illustrated in FIG. 8, the elongated through-hole 138 with the outer piece 134 has a stepped, elongated inner circumferential surface; more specifically, this inner circumferential surface is constituted by the small-sized inner circumferential surface 140 (in a top plan view, it coincides with the elongated through-hole 138 depicted in FIG. 10) as viewed from top and located on a top side (i.e., a near side to the first mold 40), and a large-sized inner circumferential surface 142 as viewed from top and located on a bottom side (i.e., a far side from the first mold 40). The inner piece 136 is mated in the elongated through-hole 138.

As illustrated in FIG. 8, similar thereto, the inner piece 136 has a stepped, elongated outer circumferential surface; more specifically, this outer circumferential surface is constituted by a small-sized outer circumferential surface 150 as viewed from top and located on a top side (i.e., a near side to the first mold 40), and a large-sized outer circumferential surface 152 as viewed from top and located on a bottom side (i.e., a far side from the first mold 40).

As illustrated in FIG. 6, in the assembled state (mated state) of the outer piece 134 and the inner piece 136, the small-sized inner circumferential surface 140 of the outer piece 134 mates on the small-sized outer circumferential surface 150 of the inner piece 136, and at the same time, the large-sized inner circumferential surface 142 of the outer piece 134 mates on the large-sized outer circumferential surface 152 of the inner piece 136.

In the mated state, a shoulder face 144 of the outer piece 134, which is located between the small-sized inner circumferential surface 140 and the large-sized inner circumferential surface 142, and a shoulder face 154 of the inner piece 136, which is located between the small-sized outer circumferential surface 150 and the large-sized outer circumferential surface 152, engage with each other. These shoulder faces 144 and 154 define the approach limit between the outer piece 134 and the inner piece 136.

Configuration of the Second Gas Vent

As illustrated in FIGS. 8 and 13, however, the large-sized inner circumferential surface 142 of the outer piece 134 is mated on the large-sized outer circumferential surface 152 of the inner piece 136 such that a gap d2 (e.g., about 1 mm) is left therebetween, while the small-sized inner circumferential surface 140 of the outer piece 134 is mated on the small-sized outer circumferential surface 150 of the inner piece 136 such that a gap G2 (e.g., about 0.1 to about 0.2 mm on the design drawing) larger than the gap d2 is left therebetween.

Although it is obvious that gasses within the cavity 70 can spontaneously vent to the outside through the gap d2 between the large-sized inner circumferential surface 142 of the outer piece 134 and the large-sized outer circumferential surface 152 of the inner piece 136, gasses within the cavity 70 can also spontaneously vent to the outside through the gap G2 between the small-sized inner circumferential surface 140 of the outer piece 134 and the small-sized outer circumferential surface 150 of the inner piece 136.

However, the gap G2 between the small-sized inner circumferential surface 140 of the outer piece 134 and the small-sized outer circumferential surface 150 of the inner piece 136 prevents the raw material within the cavity 70 from leaking through this gap G2, because it is located closer to the upstream side than the gap d2 and it is smaller than the gap d2. The reason is that the gap G2 is small enough to block the raw material, while it is viscous, from passing through the gap G2 thanks to the viscosity resistance of the raw material, even if the raw material attempts to pass through the gap G2.

As a result, the gap G2 between the small-sized inner circumferential surface 140 of the outer piece 134 and the small-sized outer circumferential surface 150 of the inner piece 136 also functions as the aforementioned gas vent (a second gas vent) that carries out degassing and filtering.

In the present embodiment, the outer piece 134 constitutes an example of the "main body," while the inner piece 136 constitutes an example of the "plug."

In FIG. 10, the gap G2 is illustrated as a slotted hole that represents the elongated through-hole 138. As illustrated, the gap G2 has a length dimension that covers, generally speaking, the entirety of the length dimension of the cavity 70, and a shape that annularly extends to encircle, generally speaking, the entirety of one of generating lines of the cavity 70 (e.g., a generating line obtained by projecting an axial centerline of the cavity 70 in a top plan view).

The length dimension of the gap G2 at least partially coincides with the length dimension of the elongated through-hole 138. The length dimension of the gap G2 is longer than 50%, more preferably 60%, more preferably 70%, more preferably 80%, and more preferably 90%, of the length of the second mold 42.

In the present embodiment, although the gap G2 extends continuously (without interruption) in the longitudinal direction of the mold unit 30, in the alternative, the present technique may be implemented in a mode in which the gap G2 extends intermittently (so that vacant parts and real parts are arranged in an alternating manner) in the longitudinal direction of the mold unit 30.

Moreover, in the present embodiment, the gap G2 is formed by setting two members between which the gap G2 is interposed, more specifically, the small-sized inner circumferential surface 140 of the outer piece 134 and the small-sized outer circumferential surface 150 of the inner piece 136, apart from each other in a direction perpendicular to the respective surfaces of those members. Alternatively and/or additionally, the gap G2, however, may be created by denting at least one of the small-sized inner circumferential surface 140 of the outer piece 134 and the small-sized outer circumferential surface 150 of the inner piece 136 to form surface irregularities (e.g., multiple generally hemi-spherical concaves and/or multiple generally hemi-spherical convexes).

In addition, in the present embodiment, as illustrated in FIGS. 8 and 10, two linear segments 156 and 157 of the gap G2 in the form of a slotted hole entirely surround an elongated region that interconnects the injection inlet port 90 and the injection outlet port 92 with the minimum length. As a result, it becomes easy to maximize the length dimension of the aforementioned first gas vent thereby maximizing the degassing capability.

More specifically, the gap G2 is formed, in the second mold 42 (additionally or alternatively, the first mold 40 may be used), as an endless continuous line (it may be replaced with an endless broken or interrupted line) that encircles the injection inlet port 90 and the injection outlet port 92 altogether. This endless continuous line includes the pair of linear segments 156 and 157 that extend in a direction substantially parallel to the longitudinal direction of the second mold 42, and a pair of curved segments 158 and 159 that externally surround the injection inlet port 90 and the injection outlet port 92, respectively (e.g., a pair of semicircular segments).

Moreover, in the present embodiment, although the gap G2 is present only in the second mold 42, the gap G2 may be present also in the first mold 40, or multiple gaps G2 may be present in the same single mold 40 or 42.

Furthermore, in the present embodiment, although the pair of linear segments 156 and 157 of the gap G2 each extend in a direction substantially parallel to the longitudinal direction of the mold unit 30, in an illustrative variant, the pair of linear segments 156 and 157 may each extend in a direction obliquely crossing the longitudinal direction of the mold unit 30.

In this illustrative variant, the length dimension of the gap G2 is longer than when the pair of linear segments 156 and 157 of the gap G2 each extend in a direction substantially parallel to the longitudinal direction of the mold unit 30, with an enhanced ability of the gap G2 to degas the raw material while it flows from the injection inlet port 90 and the injection outlet port 92.

In addition, in the present embodiment, the pair of curved segments 158 and 159 of the gap G2 are disposed in the vicinity of the injection inlet port 90 and the injection outlet port 92 such that the curved segments 158 and 159 surround the injection inlet port 90, which is located at or near an upstream end of the cavity 70, and the injection outlet port 92, which is located at or near a downstream end of the cavity 70, respectively.

As a result, in the present embodiment, degassing the raw material through the gap G2 starts immediately after it fills into the cavity 70, and this degassing continues up to the point where the raw material reaches the injection outlet port 92 or a small quantity is discharged from the injection outlet port 92.

In this manner, it is possible for the raw material to continuously experience the degassing effect performed by the gap G2 while it flows from the injection inlet port 90 to the injection outlet port 92.

In addition, in the present embodiment, the aforementioned second gas vent is formed as the gap G2 between the outer piece 134 and the inner piece 136, which are two separate parts that together form the second mold 42.

The gas vent(s), however, may be formed alternatively and/or additionally in the first mold 40 and/or the second mold 42, without straddling these two molds 40 and 42, in the form of a slit or an array of through holes that penetrates through the thickness of a single mold 40 or 42, with a shape that does not allow the viscous material to pass through the slit or the array of through holes.

Configuration of the Cores within the Mold Unit

Figure 12A:
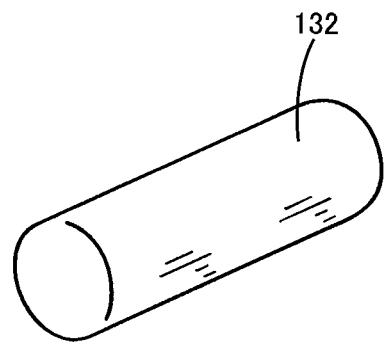
FIG. 12A is an enlarged perspective view of the core depicted in FIG. 11.
Figure 12B:
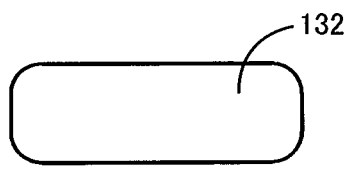
FIG. 12B is a side view of the core.
Figure 12C:
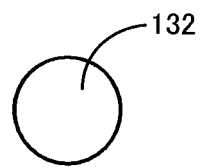
FIG. 12C is a front view of the core.

As illustrated in FIG. 8, multiple cores 132 are mounted on the inner piece 136. As illustrated in FIG. 12, each core 132 extends rectilinearly with a generally circular cross-section; although both ends thereof may have a convex shape that is flatter than a hemi-spherical shape, they may have a hemi-spherical shape.

When disposed within the cavity 70, the cores 132 have a generally streamlined shape with respect to the flow of the raw material (in particular, the flow from the upstream side to the downstream side); the possibility is reduced that gasses within the cavity 70 will admix into the raw material owing to stagnation, vortexes or the like behind the cores 132 when the raw material flows within the cavity 70.

Figure 5B:
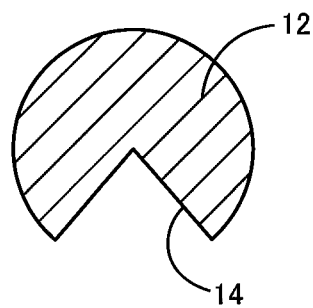
FIG. 5B is a cross-sectional view taken along line B-B in FIG. 4.
Figure 13A:
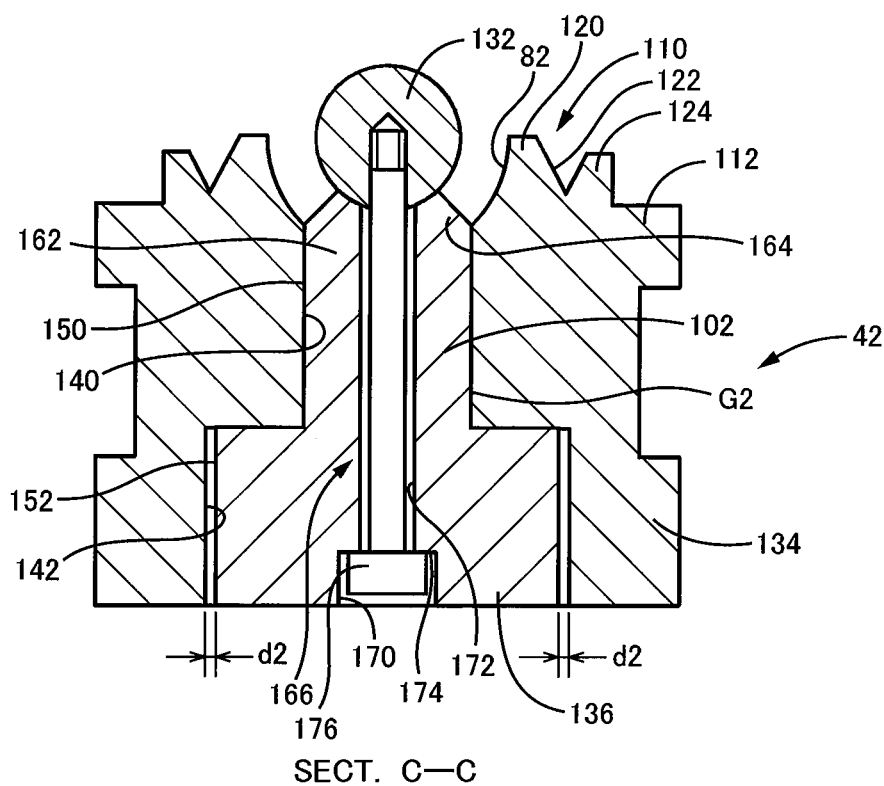
FIG. 13A is a cross-sectional view taken along line C-C in FIG. 8.
Figure 13B:
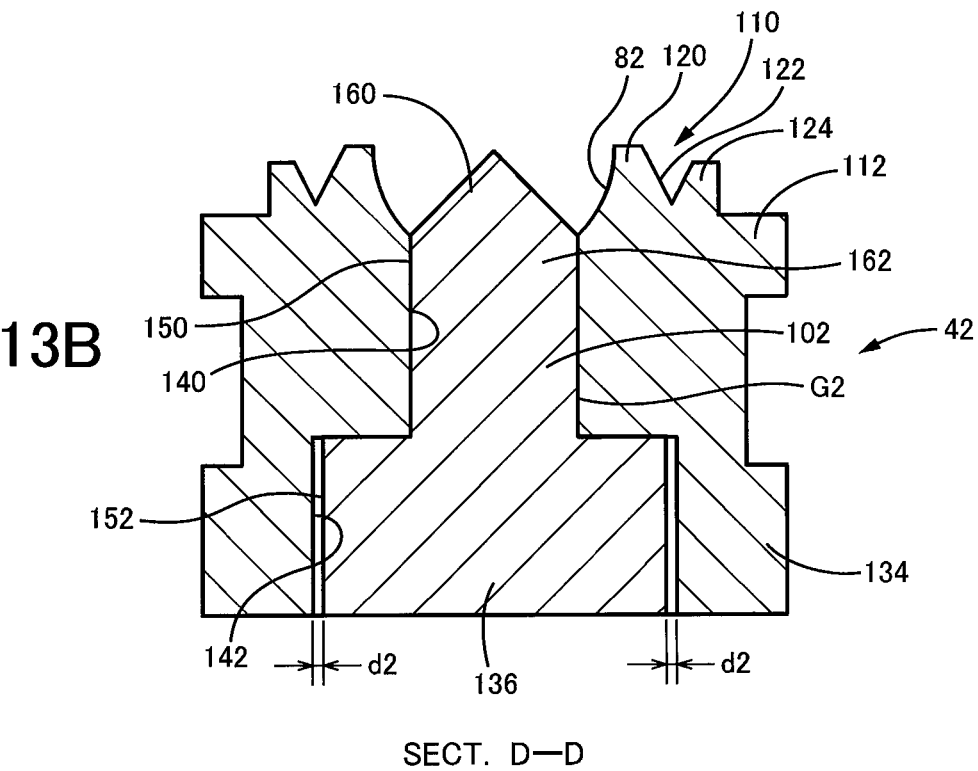
FIG. 13B is a cross-sectional view taken along line D-D in FIG. 8.

As illustrated in FIG. 8, the inner piece 136 extends along a length direction; the cross section depicted in FIG. 13A (i.e., the cross section of a region of the inner piece 136 in which a core 132 is mounted) and the cross section depicted in FIG. 13B (i.e., the cross section of a region of the inner piece 136 in which a core 132 is not mounted) repeat in an alternating manner along this length direction. The portions of the product 12 depicted in FIG. 5A are formed by the cross section depicted in FIG. 13A; on the other hand, the portions of the product 12 depicted in FIG. 5B are formed by the cross section depicted in FIG. 13B.

As illustrated in the cross-sectional front view of FIG. 13B, the regions of the inner piece 136, in which the cores 132 are not mounted, have a vertex at the center point of the semi-circular cross section of the second hollow portion 82; in addition, they have: a triangle-shaped cross section 160, which has an apex angle of 90 degrees; and a parallel cross section part 162, which extends downwardly from points where the outer surface of the triangular-shaped cross section 160 and a surface of the second hollow portion 82 engage and which has a pair of side surfaces that are parallel to each other.

Figure 11:
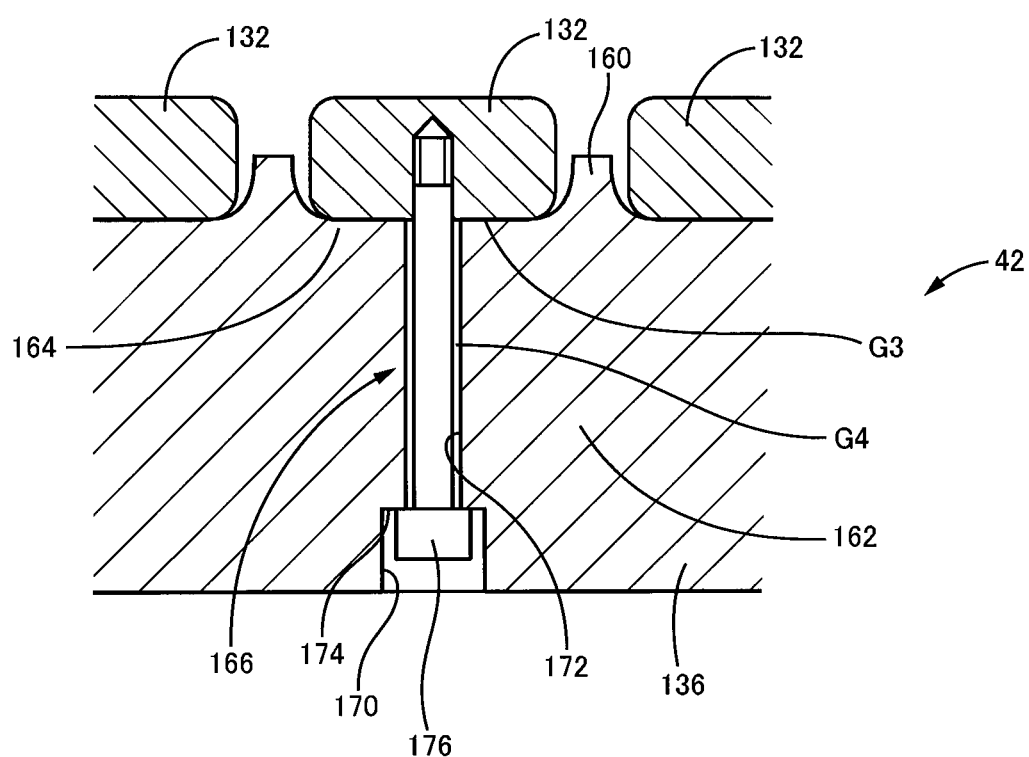
FIG. 11 is an enlarged cross-sectional side view of a portion of the second mold depicted in FIG. 8, with a core assembled with the second mold.

In contrast thereto, as illustrated in the cross-sectional side view of FIG. 11 and the cross-sectional front view of FIG. 13A, each of the regions of the inner piece 136, in which the cores 132 are mounted, have: a quasi-trapezoid-shaped cross section 164, which is obtained by truncating the triangle-shaped cross section 160, and the parallel cross section part 162. The tip surface of the quasi-trapezoid-shaped cross section 164 has a concave shape that fits with the bottom surface of the corresponding core 132.

As illustrated in the cross-sectional side view of FIG. 11, each of the regions of the inner piece 136, in which the cores 132 are mounted, have a step-shaped bolt hole 166 that concurrently penetrates through the quasi-trapezoid-shaped cross section 164 and the parallel cross section 162. The bolt hole 166 provides fluid communication between an inner space and an outer space of the cavity 70. The bolt hole 166 is a stepped hole and has a larger-diameter hole 170 on the exterior side and a smaller-diameter hole 172 and the interior side of the stepped hole. It has a shoulder face 174 between the larger-diameter hole 170 and the smaller-diameter hole 172.

A bolt 176 having a head is inserted into the bolt hole 166. This insertion continues up to the point where the head of the bolt 176 abuts the shoulder face 174. A tip of a shaft of the bolt 176 inwardly passes through the bolt hole 166, protrudes from the inner surface of the inner piece 136, and projects into the inner space of the cavity 70. Corresponding cores 132 (female threaded portions) are respectively screwed onto the exposed portions of the bolts 176 (male threaded portions). The cores 132 are secured to the inner piece 136 by the bolts 176.

As illustrated in FIG. 8, the injection inlet port 90 and the injection outlet port 92 are respectively formed at the two longitudinal ends of the inner piece 136 of the second mold 42. The injection inlet port 90 and the injection outlet port 92 provide fluid communication between the inner space and the outer space of the cavity 70.

As is evident from the foregoing, the inner piece 136, which is one piece, realizes: the function of contributing to the formation of the aforementioned second gas vent, the function of allowing the cores 132 to be installed, and the function of forming the injection inlet port 90 and the injection outlet port 92.

In addition, in the present embodiment, each core 132, which are each one piece, realizes: the function of forming the hollow portions 20 within the product 12, and the function of contributing to the formation of the third gas vent.

Configuration of the Third Gas Vent

A gap G3 exists between an outer surface of each core 132 and the surface of the inner piece 136 that are in contact, and further, a gap G4 exists between an outer surface of each bolt 176 and an inner surface of the corresponding bolt hole 166. The gaps G3 and G4 are in fluid communication; as a result, the gaps G3 and G4 provide fluid communication between the inner space and the outer space of the cavity 70. Similarly, these two gaps G3 and G4 cooperate to form a third gas vent.

As understood from the above, in the present embodiment, the aforementioned first gas vent is present in mold mating regions where the first mold 40 and the second mold 42 mate with each other, the aforementioned second gas vent is present between the outer piece 134 and the inner piece 136 of the second mold 42, and the aforementioned third gas vent is present between the inner piece 136, the multiple cores 132 and the multiple bolts 176.

Orientation of Mold Unit

Horizontal Orientation

Figure 14:
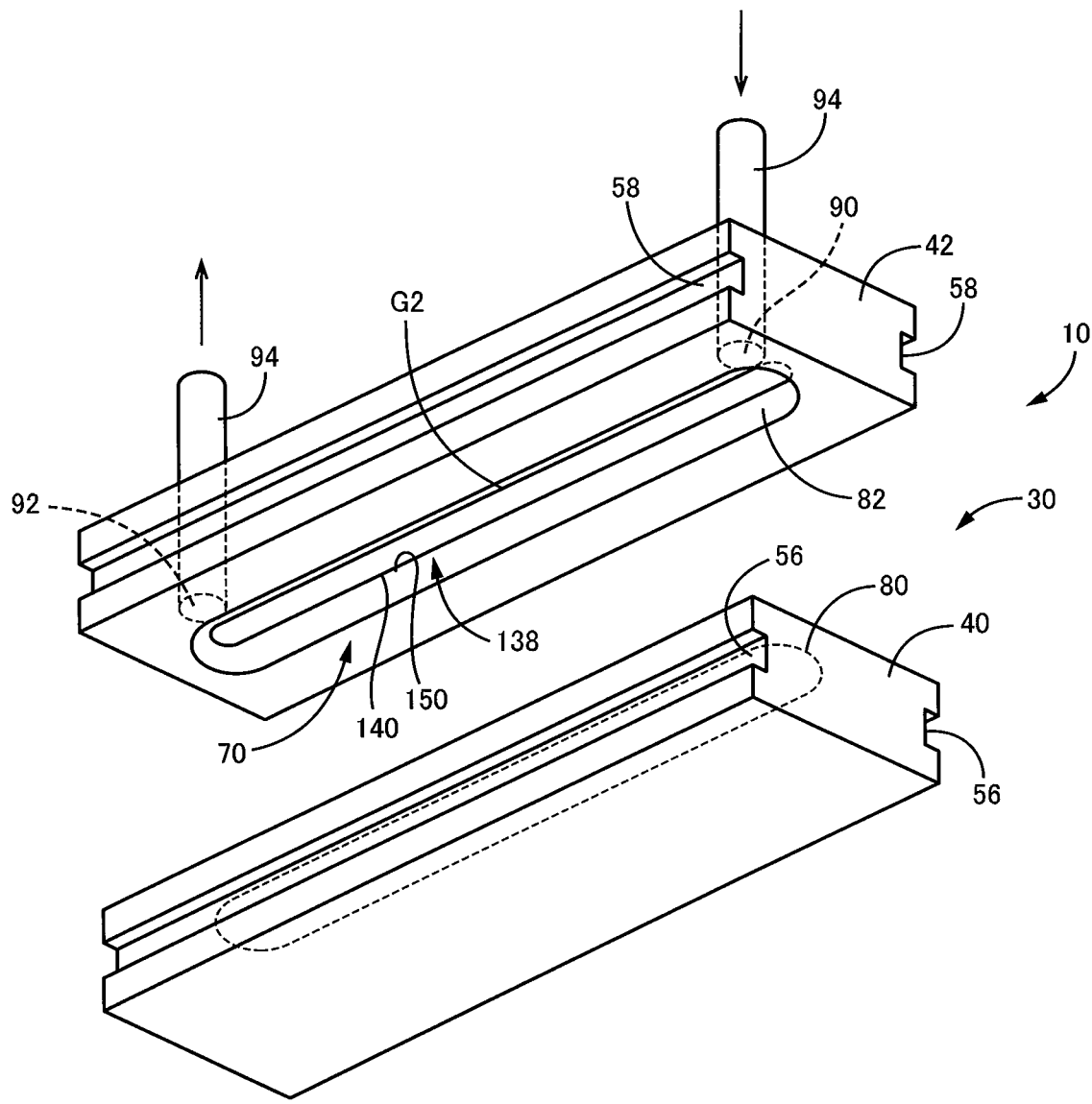
FIG. 14 is a perspective view of the mold unit depicted in FIG. 1 when, in use, it is held in an orientation different from that of FIG. 1.

As illustrated in FIGS. 1 and 14, in one example, the mold unit 30 is horizontally oriented. In the example as illustrated in FIG. 1, the first mold 40 is disposed on the upper side and the second mold 42 is disposed on the lower side. In the other example as illustrated in FIG. 14, conversely, the first mold 40 is disposed on the lower side and the second mold 42 is disposed on the upper side.

In the orientation illustrated in FIG. 1, the aforementioned second gas vent (gap G2), the injection inlet port 90 and the injection outlet port 92 are disposed on the lower surface of the cavity 80. As a result, when the raw material is injected into the injection inlet port 90 in the opposite direction to gravity, this raw material gradually accumulates on the lower surface of the cavity 70.

Therefore, the probability becomes lower that gasses within the cavity 70 will admix into the raw material during injection of the raw material owing to the undesirable possibility that this raw material divides and scatters and entrains gasses within the cavity 70.

When the raw material is further injected, the probability is high that the raw material will flow downstream along the lower surface of the cavity 70 while being in contact with the gap G2. Even if the raw material is in contact with the gap G2, the raw material is prevented from leaking through this gap G2.

In contrast, in the orientation illustrated in FIG. 14, the the aforementioned second gas vent (gap G2), the injection inlet port 90 and the injection outlet port 92 are disposed on the upper surface of the cavity 80. As a result, when the raw material is injected into the injection inlet port 90 in the same direction as gravity, it drops onto the lower surface of the cavity 70.

When the raw material is further injected, there is strong tendency for the raw material to flow downstream along the lower surface of the cavity 70 while scarcely contacting the gap G2. For this reason, because the raw material scarcely contacts the gap G2 until the cavity 70 is almost completely filled up with the raw material, it is less likely that the gap G2 is entirely and completely clogged with the raw material and then loses its function of degassing than in the case of the orientation illustrated in FIG. 1.

As a result, the gap G2 can exhibit the degassing effects for an extended time. For example, even if the raw material contacts the gap G2, it is prevented from leaking through the gap G2.

It is possible to modify the orientation depicted in FIG. 14 so that the injection inlet port 90 is disposed not in the second mold 42, which is the upper mold, but in the first mold 40, which is the lower mold.

According to this modified version, it is less likely that the raw material, when being injected, drops onto the lower surface of the cavity 70 and then causes gasses to admix into the raw material; it is also less likely that the raw material contacts the aforementioned second gas vent, which may cause the aforementioned second gas vent to become entirely and completely clogged with the raw material, and then lose its degassing function.

In this modified version, the raw material tends to concentrate in the lower space within the cavity 70, whereas gasses within the cavity 70 and gasses within the raw material tend to concentrate in the upper space within the cavity 70.

As a result, according to this modified version, it is more inclined that the raw material and gasses are separated within the cavity 70 at different levels, by taking advantage of specific gravity difference therebetween, with an enhanced degassing effect of the aforementioned second gas vent.

Inclined or Vertical Orientation

Differently from the examples depicted in FIGS. 1 and 14, in an alternative example, although not illustrated, the mold unit 30 is oriented obliquely or vertically.

In an example for implementing this orientation, the upstream side of the flow of the raw material (i.e., the side on which the injection inlet port 90 is located) is positioned obliquely or vertically with an attitude higher than the downstream side (i.e., the side on which the injection outlet port 92 is located). According to this orientation, the sequential accumulation of the raw material within the cavity 70 from the vicinity of the injection outlet port 92 (disposed on the upper surface or the lower surface of the cavity 70) is facilitated. According to this non-horizontal orientation, even if the aforementioned second gas vent is disposed on the lower surface of the cavity 70, the likelihood is reduced that the aforementioned second gas vent is entirely and completely clogged with the raw material and then loses its function of degassing.

In an alternative example, conversely, the upstream side of the flow of the raw material (i.e., the side on which the injection inlet port 90 is located) is positioned obliquely or vertically with an attitude lower than the downstream side (i.e., the side on which the injection outlet port 92 is located). According to this orientation, the sequential accumulation of the raw material within the cavity 70 from the vicinity of the injection inlet port 90 (disposed on the upper face or the lower face of the cavity 70) is facilitated. According to this non-horizontal orientation, even if the aforementioned second gas vent is disposed on the lower surface of the cavity 70, the likelihood is reduced that the aforementioned second gas vent is entirely and completely clogged with the raw material and then loses its function of degassing.

Injection Molding Method for Producing an Elongate Product Using an Injection Molding Apparatus The above-described injection molding apparatus 10 is used, for example, to injection mold an elongate product 12 in the following manner.

Clamping Step

A worker engages the first mold 40 and the second mold 42 with each other, and in this state, engages the second clamp 54 with the first clamp 52. Subsequently, the worker manipulates the manipulatable lever 60 and clamps the first mold 40 and the second mold 42 together.

Filling Step

The worker causes the raw material to be injected into the cavity 70 through the injection inlet port 90, which is upstream of the cavity, without forced compression or decompression; as a result, the space within the cavity 70 is gradually filled with the raw material from the upstream side.

During this filling step, spontaneous degassing (gasses are spontaneously discharged from the cavity 70) along with filtering (although gasses pass through, viscous material does not pass through) is effected by the aforementioned three gas vents (i.e., G1, G2 and the combination of G3 and G4).

As a result, as the raw material is injected, gasses previously residing within the cavity 70 are discharged through the aforementioned three gas vents (principally, the second gas vent) and the injection outlet port 92. Concurrently, gasses previously entrained within the raw material are also discharged through the aforementioned three gas vents (principally, the second gas vent) and the injection outlet port 92. In this manner, degassing of the raw material is performed.

However, to effectively perform degassing while injecting the raw material, the raw material also may be pushed into the cavity 70 under increased pressure, and/or the raw material also may be drawn into the cavity 70 by depressurizing the cavity 70.

Curing Step

The worker causes the mold unit 30 to be heated, which thereby heats the raw material filled therein, without applying increased pressure thereto (under atmospheric pressure), thereby curing the raw material to mold it.

To cure the raw material, however, heating the raw material is not essential and the raw material also may be cured at room temperature.

Removal Step

After the raw material is cured, the worker disengages the clamp unit 50, separates the first mold 40 and the second mold 42 of the mold unit 30 from each other, and removes the product 12 from the mold unit 30.

It is noted that, in the exemplary injection molding method described above, although all of those steps are manually performed by a worker, all or some of the steps may be automatically performed using a machine or machines.

As is evident from the foregoing, in the injection molding apparatus and the injection molding method according to the present embodiment, the tendency that the fluid viscous material flows unidirectionally within a cavity is increased, the risk that the viscous material is undesirably segmented or fragmented within the cavity is reduced. Therefore, the possibility is reduced that multiple portions separated from the viscous material collide with each other within the cavity and causing gasses within the cavity to be admixed within the viscous material.

Furthermore, according to the present embodiment, gasses previously entrained within the viscous material as well as gasses within the cavity are certainly discharged to the outside of the cavity owing to the air vents; as a result, degassing of the viscous material also is achieved.

Furthermore, according to the present embodiment, because the air vents are disposed in an array along the flow of the viscous material within the cavity, gasses previously entrapped within the viscous material are more effectively discharged to the outside of the cavity; as a result, degassing of the viscous material is effectively achieved.

Furthermore, according the present embodiment, because the raw material to be injected into the cavity is a viscous material, the degassing function and a filtering function that allows gasses to pass through but does not allow the viscous material to pass through are realized, without having to rely on any filters as additional elements, only if gaps, slits or through-holes are provided in the mold unit and the dimensions of these elements are appropriately selected while taking into account the viscosity resistance of the viscous material.

Sealing Method Implemented by Using the Elongate Product as a Pre-Molded Sealant The thus-manufactured elongate product 12 may be used as a pre-molded sealant for a sealing process in the exemplary manner described below. The product 12, however, may be used in applications other than the sealing process, such as an application in which it is used as a final product without any modifications thereto.

Pre-Molded Sealant Preparation Step

The worker applies an adhesive to the surface of a portion of the pre-molded sealant 12, to which an elongate target region of the structural member 16 is attached (i.e., a portion of the structural member 16 where it is intended for the sealing process, such as a seam or juncture of the structural member 16, or a different portion of the structural member 16 from the intended portion, which is positionally associated with the intended portion). In some cases, the worker also applies the adhesive to the target region of the structural member 16.

In case the length of a single unit of the pre-molded sealant 12, after being molded, is longer than the present target region of the structural member 16, the worker cuts the pre-molded sealant 12 to conform to the length of the target region (e.g., so that it has a length that does not exceed the length of the present target region).

Pre-Molded Sealant Addition Step

In case a single unit of the pre-molded sealant 12 is not long enough to cover the entirety of the present target region, the worker also prepares another unit of the pre-molded sealant 12 by appropriately cutting it.

Pre-Molded Sealant Shape-Adjustment Step

Because the pre-molded sealant 12 is flexible, even when the present target region has a curved segment whose curvature is not too high, the pre-molded sealant 12 can fit the present target region without excessive wrinkling thereon.

However, in case the curvature of the curved segment of the present target region is too great, the worker, prior to attachment of the pre-molded sealant 12 to the present target region, makes some cuts or slits in a portion of the pre-molded sealant 12 with which the curved segment of the present target region will mate, using a cutter, thereby increasing the flexibility of the pre-molded sealant 12.

Pre-Molded Sealant Attachment Step

Figure 3A:
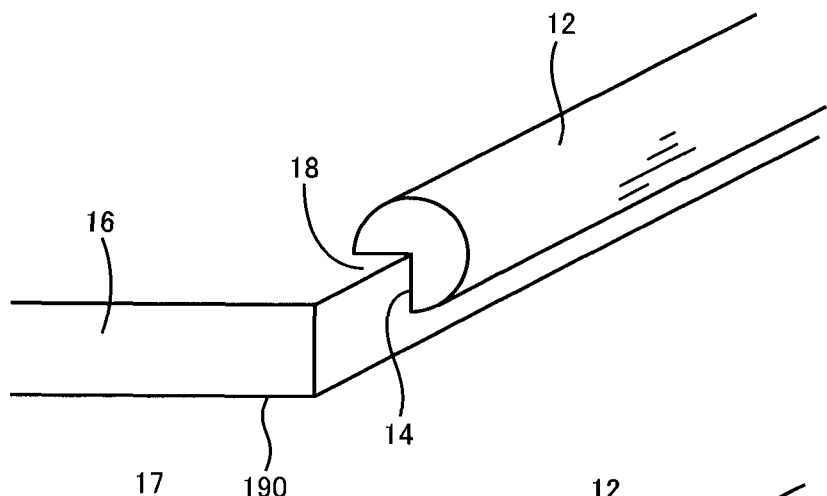
FIGS. 3A, 3B, 3C and 3D are perspective views for explaining a sealing method to be implemented for a sealing process using the product depicted in FIG. 2 as a pre-molded sealant, for the purpose of explaining some examples of uses of the product.

Subsequently, as illustrated in FIG. 3A, the worker positions one or more units of the pre-molded sealant 12 at the present target region for adhesion or adhesive bonding thereto. As a result, the one or more units of the pre-molded sealant 12 are permanently secured to the present target region, principally due to the aforementioned adhesive.

As described above, the cutout 14 is present in the pre-molded sealant 12; on the other hand, the counterpart that is attached thereto is an edge 18 that has a shape complementary to the cutout 14. Therefore, by a simple manipulation of mating the cutout 14 and the edge 18 with each other, it is possible for the worker precisely position the pre-molded sealant 12 relative to the present target region.

Liquid Sealant Application Step

Figure 3B:
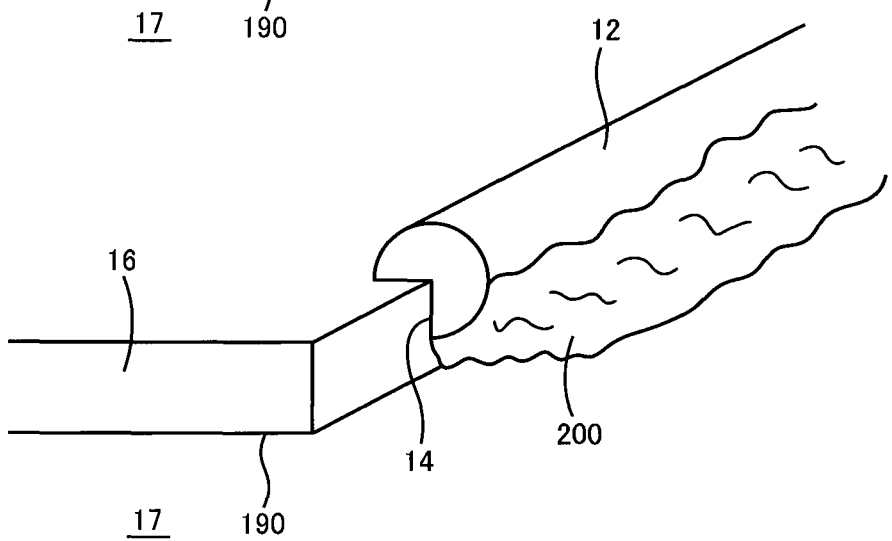
Figure 3C:
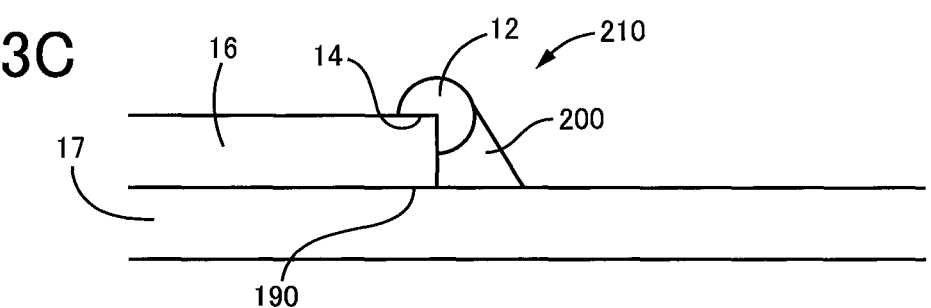
Figure 3D:
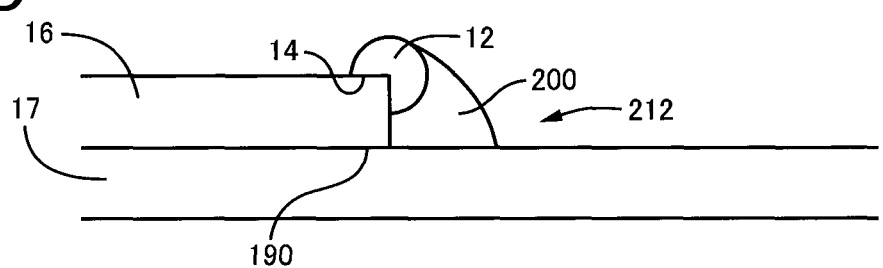

Thereafter, as illustrated in FIG. 3B, 3C or 3D, in order to fill a gap 190 (e.g., a seam, joint) between mating surfaces of two members 16 and 17 of the structural body, the worker applies the same kind of a material as that of the pre-molded sealant 12 in the form of a liquid or wet sealant 200 to the gap 190 between the two members 16 and 17, using a dispensing gun (not illustrated). As a result, a final seal 210 or 212 is formed as a combined body of the pre-molded sealant 12 and the liquid sealant 200.

A cartridge (not illustrated) filled with the liquid sealant 200 is loaded into the dispensing gun. By driving this cartridge using a high-pressure gas source or a motor, the dispensing gun extrudes a desired amount of the liquid sealant 200 towards the target region.

For example, as illustrated in FIG. 3B, 3C or 3D, when two plate-shaped structural members 16 and 17 are superimposed, a fillet seal 210 or 212 is formed at a seam of a join part of those structural members 16 and 17, that is, at the gap 190.

As a result, in the example depicted in FIG. 3C, a fillet seal 210 having a flat, inclined outer surface is formed by the union of the pre-molded sealant 12 and the liquid sealant 200 at the gap 190 between the two members 16 and 17. In this case, from among the pre-molded sealant 12 and the liquid sealant 200, the liquid sealant 200 directly fills the gap 190.

In contrast thereto, in the example depicted in FIG. 3D, a fillet seal 212 having an outwardly convex curved outer surface is formed by the union of the pre-molded sealant 12 and the liquid sealant 200 at the gap 190 between the two members 16 and 17, wherein the pre-molded sealant 12 has a shape that radially bulges out. In this case, from among the pre-molded sealant 12 and the liquid sealant 200, the liquid sealant 200 directly fills the gap 190.

In the example depicted in FIG. 3B, 3C or 3D, the sealing operation by the worker comprises prior installation of the pre-molded sealant 12 and a subsequent application of the liquid sealant 200. As a result, the cross-sections of the final seal 210 or 212 is the combination of the cross section of the pre-molded sealant 12 and the cross section of the liquid sealant 200.

The portion of the cross section of the final seal 210 or 212 that is covered by the cross section of the pre-molded sealant 12 includes the cross section of the portion of the pre-molded sealant 12 which is deposited on the upper surface of the structural plate 16. This cross section is a raised portion on the upper surface of the structural plate 16, which a portion that is prone to drooping. For this reason, in order for the worker to reshape the raised portion using the dispensing gun, it requires careful labor and more time and effort than other portions.

In contrast thereto, according to the examples depicted in FIG. 3B, 3C or 3D, the portion of the seal, which would be difficult to be reshaped if it were made of the liquid sealant 200, is pre-formed as the pre-molded sealant 12. Therefore, seals 210, 212 having a more precise cross section are obtained than when the worker instead applies the liquid sealant 200 to the structural members 16 and 17 from the beginning, and furthermore, the work/assembly burden is reduced.

Moreover, according to the examples depicted in FIG. 3B, 3C or 3D, the worker positions the dispensing gun with respect to the target region of the structural members 16 and 17 more precisely than when the worker instead applies the liquid sealant 200 to the structural members 16 and 17 from the beginning, thereby facilitating the stabilization of the sealing performance.

This is because, in the examples depicted in FIG. 3B, 3C or 3D, the worker is able to apply the liquid sealant 200 to the structural members 16 and 17 using a visual fiducial point defined as the position of the pre-molded sealant 12 that is previously disposed on the structural members 16 and 17 with relatively high precision, resulting in an improvement in the positional precision of where the liquid sealant 200 is actually applied and the precision of a cross-sectional shape of the liquid sealant 200, and therefore the position and the quality of a cross-sectional shape of the final seal 210 or 212 are improved.

In this regard, the quality of the cross-sectional shape is defined to include, for example, the height of the seal (e.g., the height of a protruding portion of the seal above from an upper face of the upper structural member 16), the width of the seal (e.g., the length of a portion of the seal laid over the surface of the upper structural member 16, the length of a portion of the seal laid over the surface of the lower structural member 17), the throat of the seal, etc.

More precisely, in the present fillet sealing process, applying the liquid sealant 200 is a vital step in that the liquid sealant 200 has a high ability to fit a mated member because of its high flexibility, but the step of applying the liquid sealant 200 is followed by the use of the pre-molded sealant 12 that is lower in flexibility but is higher in the precision of the cross-sectional shape of the liquid sealant 200, thereby improving the stability of the position where the liquid sealant 200 is actually applied and the cross-sectional shape that the liquid sealant 200 actually has.

Incidentally, instead of the examples depicted in FIG. 3B, 3C or 3D, the sealing operation may be performed by manufacturing the pre-molded sealant 12 from the beginning so as to have the same cross-sectional shape as that of the final seal 210 or 212 as intended.

According to this aspect, because the application of the liquid sealant 200 is omitted, the sealing operation is simpler than each of the examples depicted in FIGS. 3C and 3D.

However, in case the complete pre-molded sealant 12 is used at the target region of the structural members 16 and 17 from the beginning, there are concerns that gaps can be unintendedly left between the final seal and the structural members 16 and 17 and concerns that the final seal can unintendedly separate from the structural members 16 and 17, due to unavoidable dimensional variations in the structural members 16 and 17.

In contrast thereto, in the examples depicted in FIG. 3B, 3C or 3D, the cross-section of the final seal 210 or 212 is the combination of the cross sections of the pre-molded sealant 12 and the liquid sealant 200, and it is possible for the worker to apply the liquid sealant 200 by maneuvering the aforementioned dispensing gun so that the shape of the liquid sealant 200 fits the actual dimensions, shape and surface irregularities of the structural members 16 and 17.

Because the liquid sealant 200 is more flexible than the pre-molded sealant 12, it easily fits in surface irregularities of the structural members 16 and 17; as a result, the liquid sealant 200 can exhibit an effective anchoring effect with respect to the irregular surface. Consequently, the liquid sealant 200 is more securely attached to the surfaces of the structural members 16 and 17.

For those reasons, in the example depicted in FIG. 3B, 3C or 3D, concerns that gaps can be unintendedly left between the final seal 210 or 212 and the structural members 16 and 17, and concerns that the final seal 210 or 212 can unintendedly separate from the structural members 16 and 17 are dispelled.

While some of illustrative implementations of the invention have been described in more detail with reference to the drawings, they are just for illustrative purposes, and the invention may be practiced in other modes produced by adding various modifications or improvements based on the knowledge of those skilled in the art, including the modes disclosed in the "SUMMARY OF THE INVENTION."

The invention claimed is:

1. An injection molding apparatus for injection molding an elongate product using a viscous material as a raw material, comprising:
    a mold unit including a first mold and a second mold,
    wherein the first mold and the second mold cooperate in a mold closed state to define an elongate cavity having a shape that replicates the desired shape of the elongate product,
    an injection inlet port for the viscous material is defined at an upstream end of the elongate cavity,
    an injection outlet port for the viscous material is defined at a downstream end of the elongate cavity, the upstream end and the downstream end being on opposite sides of the elongate cavity in a longitudinal direction of the elongate cavity,
    the injection inlet port and the injection outlet port are both defined in the first mold, are both defined in the second mold, or one of them is defined in the first mold and the other is defined in the second mold,
    a gas vent is defined in at least one of the first mold and the second mold such that, when viewed in a direction normal to mating surfaces of the first mold and the second mold in the mold closed state, the gas vent extends continuously along an endless annular line that externally encircles both of the injection inlet port and the injection outlet port, and
    the gas vent is configured to vent gasses from the viscous material through the gas vent while retaining the viscous material in the elongate cavity.

2. The injection molding apparatus according to claim 1, wherein the gas vent is formed in a gap between a plurality of parts of the at least one of the first mold and the second mold, or as a slit integrally formed in the at least one of the first mold and the second mold.

3. The injection molding apparatus according to claim 1, wherein, when viewed in the direction normal to the mating surfaces of the first and second molds, the endless annular line includes a pair of linear segments that extend in the direction having the component in parallel to the direction of the flow path of the viscous material from the injection inlet port to the injection outlet port, and a pair of curved segments externally surrounding the injection inlet port and the injection outlet port, respectively.

4. The injection molding apparatus according to claim 1, wherein:

the gas vent is configured to be in contact with the raw material when the elongate cavity is fully or partially filled with the raw material, and when viewed in the direction normal to the mating surfaces of the first and second molds, the gas vent is spaced apart from the mating surfaces of the first and second molds.

5. The injection molding apparatus according to claim 1, wherein:

at least one of the first mold and the second mold is divided into a main body having an elongate through hole extending longitudinally along the elongate cavity, and an elongate plug that is non-airtightly fitted into the elongate through hole extends longitudinally along the cavity, and in the assembled state of the main body and the plug, a gap between the main body and the elongate plug forms an endless annular line that externally encircles both the injection inlet port and the injection outlet port when viewed in the direction normal to the mating surfaces of the first and second molds, and the gap functions as the gas vent.

6. The injection molding apparatus according to claim 5, wherein the injection inlet port and the injection outlet port are respectively disposed at opposite longitudinal-direction ends of the elongate plug when viewed in the direction normal to the mating surfaces of the first and second molds.

7. The injection molding apparatus according to claim 5, wherein:

the product has a hollow portion that extends in the longitudinal direction of the product, the mold unit includes a core shaped to form the hollow portion, and the core is attached to the elongate plug.

8. A method of using the injection molding apparatus of claim 6 to mold the elongate product using the viscous material, which is a thermosetting synthetic resin, as the raw material, comprising:

mounting the plug so that the plug fits in a state that is not airtight in the elongate through-hole;

clamping the first mold and the second mold together;

injecting the viscous material into the elongate cavity through the injection inlet port and thereby filling the elongate cavity with the viscous material, while degassing the viscous material through the gas vent formed by the plug fit in the through-hole in the non-airtight state;

heating the mold to thereby heat the viscous material filled therein, without pressurization, thereby curing and molding the viscous material; and after curing of the viscous material to form the elongate product, releasing the clamp, opening the mold unit, and removing the elongate product from the mold unit.

9. A method of using the injection molding apparatus of claim 1 to mold the elongate product using the viscous material as the raw material, the method comprising:

injecting the viscous material into the elongate cavity through the injection inlet port, thereby gradually filling the cavity with the viscous material from the injection inlet port to the injection outlet port;

wherein the viscous material that is being injected into the elongate cavity causes gasses previously-accumulated within the elongate cavity to be discharged through the gas vent and the injection outlet port; and after the mold unit is filled with the viscous material, curing and molding the viscous material to form the elongate product.

10. The method according to claim 9, wherein the gas vent includes:

at least one pair of linear segments that extend in a direction that includes a component in parallel to a direction of a flow path of the viscous material from the injection inlet port to the injection outlet port, and at least one pair of curved segments that externally surround the injection inlet port and the injection outlet port, respectively.

11. The injection molding apparatus according to claim 1, wherein the gas vent is defined by the mating surfaces of the first and second molds in the closed mold state.

12. The injection molding apparatus according to claim 1, wherein the mating surfaces of the first and second molds are rougher than the surfaces of the first and second molds that define the elongate cavity.

13. The injection molding apparatus according to claim 1, wherein the first and second molds are made of polytetrafluorethylene or polyoxymethylene.

14. The injection molding apparatus according to claim 11, wherein:

the gas vent is a first gas vent that externally encircles the elongate cavity when viewed in the direction normal to the mating surfaces of the first and second molds;

at least one of the first mold and the second mold is divided into a main body having an elongate through hole extending longitudinally along the elongate cavity, and an elongate plug that is non-airtightly fitted into the elongate through hole extends longitudinally along the cavity, and in the assembled state of the main body and the plug, a gap between the main body and the plug forms an endless line that externally encircles both the injection inlet port and the injection outlet port when viewed in the direction normal to the mating surfaces of the first and second molds, and the gap functions as a second gas vent.

15. The injection molding apparatus according to claim 14, wherein:

the first and second gas vents are configured to be in contact with the raw material when the elongate cavity is fully or partially filled with the raw material, and when viewed in the direction normal to the mating surfaces of the first and second molds, the second gas vent is spaced apart from the mating surfaces of the first and second molds.

16. The injection molding apparatus according to claim 15, wherein the first and second gas vents are configured such that gasses vented through the first and second gas vents do not pass through the injection outlet port.

17. The injection molding apparatus according to claim 16, wherein, when viewed in the direction normal to the mating surfaces of the first and second molds, the endless annular lines of both of the first and second gas vents each includes a pair of linear segments that extend in the direction having the component in parallel to the direction of the flow path of the viscous material from the injection inlet port to the injection outlet port, and a pair of curved segments externally surrounding the injection inlet port and the injection outlet port, respectively.

18. The injection molding apparatus according to claim 17, wherein the mating surfaces of the first and second molds are rougher than the surfaces of the first and second molds that define the elongate cavity.

19. The injection molding apparatus according to claim 18, wherein the first and second molds are made of polytetrafluorethylene or polyoxymethylene.

20. The injection molding apparatus according to claim 1, wherein the gas vent is configured such that gasses vented through the gas vent do not pass through the injection outlet port.

* * * * *